(12) United States Patent
Izawa

(10) Patent No.: US 9,712,752 B2
(45) Date of Patent: Jul. 18, 2017

(54) IMAGE PROCESSING DEVICE, IMAGING DEVICE, IMAGE PROCESSING METHOD, AND COMPUTER READABLE MEDIUM, CAPABLE OF IMPROVING VISIBILITY OF A BOUNDARY LINE BETWEEN A FIRST DISPLAY IMAGE AND A SECOND DISPLAY IMAGE FOR USE IN FOCUS-CHECKING

(71) Applicant: FUJIFILM CORPORATION, Minato-ku, Tokyo (JP)

(72) Inventor: Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 73 days.

(21) Appl. No.: 14/642,774

(22) Filed: Mar. 10, 2015

(65) Prior Publication Data

US 2015/0181127 A1 Jun. 25, 2015

Related U.S. Application Data

(63) Continuation of application No. PCT/JP2013/071180, filed on Aug. 5, 2013.

(30) Foreign Application Priority Data

Sep. 19, 2012 (JP) ................................ 2012-205905

(51) Int. Cl.
*H04N 5/232* (2006.01)
*H04N 9/04* (2006.01)
(Continued)

(52) U.S. Cl.
CPC .......... *H04N 5/23293* (2013.01); *G02B 7/34* (2013.01); *G03B 17/18* (2013.01);
(Continued)

(58) Field of Classification Search
CPC .......... H04N 5/23293; H04N 5/23212; H04N 5/3696; H04N 9/045; H04N 9/07;
(Continued)

(56) References Cited

U.S. PATENT DOCUMENTS

2001/0033395 A1* 10/2001 Chizawa .............. H04N 1/6027
358/461
2004/0051795 A1* 3/2004 Ajioka ............... G06K 9/00234
348/239

(Continued)

FOREIGN PATENT DOCUMENTS

JP 2000-078607 A 3/2000
JP 2008-116848 A 5/2008
JP 2009-147665 A 7/2009

*Primary Examiner* — Lin Ye
*Assistant Examiner* — Chan Nguyen
(74) *Attorney, Agent, or Firm* — SOLARIS Intellectual Property Group, PLLC

(57) ABSTRACT

There is provided an image processing device, includes: a first display image generation section that generates a first display image; a second display image generation section that generates a second display image for use in focus-checking; an acquisition section that acquires color data of the first display image; a determination section that, based on the color data, determines as a display color for the second display image a color with different color characteristics from color characteristics of the first display image; and a display controller that displays on a display section the first display image generated by the first display image generation section, and displays on the display section the second display image generated by the second display image generation section within a display region of the first display image.

19 Claims, 18 Drawing Sheets

(51) Int. Cl.
    *G02B 7/34*         (2006.01)
    *G03B 17/18*      (2006.01)
    *H04N 9/07*       (2006.01)
    *H04N 13/02*      (2006.01)
    *H04N 5/369*      (2011.01)

(52) U.S. Cl.
    CPC ....... *H04N 5/23212* (2013.01); *H04N 5/3696* (2013.01); *H04N 9/045* (2013.01); *H04N 9/07* (2013.01); *H04N 13/0232* (2013.01); *H04N 13/0257* (2013.01); *H04N 13/0285* (2013.01); *H04N 5/23245* (2013.01); *H04N 2209/045* (2013.01)

(58) Field of Classification Search
    CPC ........... H04N 13/0232; H04N 13/0257; H04N 13/0285; G02B 7/34; G03B 17/18
    USPC .................................................... 348/333.01
    See application file for complete search history.

(56) References Cited

U.S. PATENT DOCUMENTS

| | | | |
|---|---|---|---|
| 2007/0057944 A1* | 3/2007 | Redert | .................. G06T 15/005 345/422 |
| 2008/0107355 A1 | 5/2008 | Onuki et al. | |
| 2009/0153693 A1 | 6/2009 | Onuki et al. | |
| 2010/0225780 A1* | 9/2010 | Shimizu | ............. H04N 5/23219 348/223.1 |
| 2012/0113314 A1 | 5/2012 | Onuki et al. | |

\* cited by examiner

FIG.7

IMAGE PROCESSING DEVICE, IMAGING DEVICE, IMAGE PROCESSING METHOD, AND COMPUTER READABLE MEDIUM, CAPABLE OF IMPROVING VISIBILITY OF A BOUNDARY LINE BETWEEN A FIRST DISPLAY IMAGE AND A SECOND DISPLAY IMAGE FOR USE IN FOCUS-CHECKING

CROSS-REFERENCE TO RELATED APPLICATIONS

This application is a continuation application of International Application No. PCT/JP2013/071180, filed Aug. 5, 2013, the disclosure of which is incorporated herein by reference in its entirety. Further, this application claims priority from Japanese Patent Application No. 2012-205905, filed Sep. 19, 2012, the disclosure of which is incorporated herein by reference in its entirety.

BACKGROUND

Technical Field

The present invention relates to an image processing device, an imaging device, an image processing method, and an computer readable medium.

Related Art

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking an imaging subject, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of the display device, such as a Liquid Crystal Display (LCD), requiring adoption of methods such as enlarging a portion for display.

In recent years, therefore, a split-image is displayed within a live-view image (also referred to as a through image), so as to make the work of focusing on the imaging subject easier for the user when in manual focus mode. Split-image used herein refers to a divided image that has been divided into two, for example (such as each image divided in the up-down direction) in which there is misalignment in the parallax generation direction (such as the left-right direction) according to focus misalignment, and is a split-image to remove the misalignment in the parallax generation direction from the in-focus state. An operator (such a photographer) operates a manual focus ring to match the focus so that misalignment of the split-image (such as each image divided in the up-down direction) is removed.

In the imaging device described in Japanese Patent Application Laid-Open (JP-A) No. 2009-147665 (hereafter referred to as Patent Document 1), out of light rays from an imaging optical system, a first subject-image and a second subject-image formed by light rays divided by a pupil divider are each photoelectrically converted to generate a first image and a second image. The first and the second images are employed to generate a split-image, and a third subject-image formed by the light rays not divided by the pupil divider are photoelectrically converted to generate a third image. The third image is displayed on a display and the generated split-image is displayed inside the third image, and color data extracted from the third image is applied to the split-image. By applying color data extracted from the third image to the split-image in this way, excellent visibility of the split-image can be achieved.

An image processing device described in JP-A No. 2000-078607 (hereafter referred to as Patent Document 2) includes a color balance adjustment processing means that adjusts color balance in an image signal input from an image input device. The color balance adjustment processing means estimates from an image signal the chromaticity of an illumination light source when the image of the image signal was acquired, and adjusts the color balance of the image signal based on the estimated chromaticity of the illumination light source.

Technical Problem

However, in the imaging device of Patent Document 1, the color characteristics of the display colors of the third images and the color characteristics of the display colors of the split-images are sometimes similar. In such cases, an issue arises in which it becomes difficult to make a visual check of a boundary line between the third image and the split-image.

Moreover, when the image processing device described in Patent Document 2 is employed to perform color balance adjustment of the split-image and images other than the split-image (such as a background image), an issue arises in which it becomes difficult to make a visual check of boundary line between the image other than the split-image and the split-image.

SUMMARY

In consideration of the above circumstances, an object of the present invention is to provide an image processing device, an imaging device, an image processing method and an image processing program capable of improving visibility of a boundary line between a first display image and a second display image for use in focus-checking.

Solution to Problem

An image processing device according to a first aspect of the present invention includes: a first display image generation section that generates a first display image, based on an image signal output from an image pick-up device including first and second pixel groups on which respective images are formed by a pupil-divided subject-image that has passed through first and second regions of an imaging lens; a second display image generation section that generates a second display image for use in focus-checking based on first and second image signals output from the first and second pixel groups; an acquisition section that acquires color data of the first display image generated by the first display image generation section; a determination section that, based on the color data acquired by the acquisition section, determines, as a display color for the second display image a color with different color characteristics from color characteristics of the first display image; a display section that displays images; and a display controller that displays on the display section the first display image generated by the first display image generation section, and displays on the display section the second display image generated by the second display image generation section within a display region of the first display image. This thereby enables the visibility of the boundary line between the first display image and the second display image for use in focus-checking to be improved more than in cases not adopting the present configuration.

In a second aspect of the present invention, the first aspect of the present invention may be configured such that the color with different color characteristics is a color having visibly different color characteristics from the color characteristics of the first display image. This thereby enables better visually discrimination between the first display image and the second display image than cases not adopting the present configuration.

In a third aspect of the present invention, the first aspect or the second aspect of the present invention may be configured such that the acquisition section acquires color data from a portion of, or all of, the first display image. This thereby enables, using a simple configuration, the color characteristics of the second display image and the color characteristics of the first display image to be made different from each other at higher precision than cases not adopting the present configuration.

In a fourth aspect of the present invention, the first aspect or the second aspect of the present invention may be configured such that the acquisition section acquires the color data based on the first display image, the first image signal and the second image signal, or based on the first display image and the second display image. This thereby enables the color characteristics of the second display image and the color characteristics of the first display image to be made different from each other at higher precision than cases not adopting the present configuration. Moreover, the fourth aspect of the present invention enables color data to be acquired even if the first display image has whiteout, due to the low sensitivity of the first and second pixel groups.

In a fifth aspect of the present invention, any one of the first aspect to the fourth aspect of the present invention may be configured such that the image pick-up device includes a normal image capture region that is employed to capture the first display image, and a focus-check image capture region that is employed to capture the second display image and is adjacent to the normal image capture region, and the acquisition section acquires color data from an image output from an edge portion on the side of a boundary with the focus-check image capture region in the normal image capture region of the first display image. This thereby enables the boundary between the first display image and the second display image to be made to stand out more clearly than in cases not adopting the present configuration.

In a sixth aspect of the present invention, any one of the first aspect to the fifth aspect of the present invention may be configured such that the color data is color data representing color characteristics of an object color of the first display image. This thereby enables visibility of the boundary line between the first display image and the second display image to be improved more than in cases not adopting the present configuration, even in cases in which the object color dominates the first display image to a greater extent than the light source color.

In a seventh aspect of the present invention, the sixth aspect of the present invention may be configured such that hue is employed as the color characteristics. This thereby enables, using a simple configuration, the boundary line between the first display image and the second display image to be made even more visible than in cases not adopting the present configuration.

In an eighth aspect of the present invention, the sixth aspect or the seventh aspect of the present invention may be configured such that the color having different color characteristics is a color that is at a predetermined angle in a color circle away with respect to the object color of the first display image. This thereby enables easy determination of an appropriate object color as the color with different color characteristics to the color characteristics of the first display image compared to cases not adopting the present configuration.

In a ninth aspect of the present invention, any one of the sixth aspect to the eighth aspect of the present invention may be configured such that the color characteristics of the object color of the first display image is a configuration ratio of primary color components in the first display image. This thereby enables not only the visibility of the boundary line between the first display image and the second display image to be improved, but also for appropriate color characteristics to be determined more easily as the color characteristics of the object color of the first display image, compared to cases not adopting the present configuration.

In a tenth aspect of the present invention, the ninth aspect of the present invention may be configured such that the configuration ratio is converted by an input-output function including a declining function, and the configuration ratio obtained after conversion is employed as the different color characteristics. This thereby enables, with a simple configuration, the visibility of the boundary line between the first display image and the second display image to be raised compared to cases not adopting the present configuration.

In an eleventh aspect of the present invention, the ninth aspect of the present invention may be configured such that the configuration ratio is converted by color conversion data, and the configuration ratio obtained after conversion is employed as the different color characteristics. This thereby enables, with a simple configuration, the visibility of the boundary line between the first display image and the second display image to be raised compared to cases not adopting the present configuration.

In a twelfth aspect of the present invention, the eleventh aspect of the present invention may be configured such that the color conversion data is color conversion data generated based on an input-output function including a declining function. This thereby enables, with a simple configuration, the visibility of the boundary line between the first display image and the second display image to be raised compared to cases not adopting the present configuration.

In a thirteenth aspect of the present invention, any one of the first aspect to the fifth aspect of the present invention may be configured such that the color data is color data representing the color characteristics of light source color of the first display image. This thereby enables visibility of the boundary line between the first display image and the second display image to be improved more than in cases not adopting the present configuration, even in cases in which the light source color dominates the first display image to a greater extent than the object color.

In a fourteenth aspect of the present invention, any one of the first aspect to the thirteenth aspect of the present invention may be configured such that the first and second pixel groups are each single color pixel groups, and the second display image generation section generates an achromatic image as the second display image based on the first and second image signals output from the first and second pixel groups. This thereby enables an achromatic second display image to be obtained with a simpler configuration than in cases not adopting the present configuration.

In a fifteenth aspect of the present invention, the fourteenth aspect of the present invention may be configured such that in cases in which the second display image is an achromatic image, the determination section determines, as the display color of the second display image a chromatic color with different color characteristics from the color characteristics of the first display image based on the color data acquired by the acquisition section. This thereby enables the chromatic color to be determined as the display color of the second display image with a simpler configuration than in cases not adopting the present configuration.

In a sixteenth aspect of the present invention, any one of the first aspect to the fifteenth aspect of the present invention may be configured such that, in cases in which the first display image and the second display image are achromatic images, the determination section determines, as the display color of the second display image a chromatic color with different color characteristics from the color characteristics of the first display image based on the color data acquired by the acquisition section. This thereby enables the visibility of the boundary line between the first display image and the second display image to be improved more than in cases not adopting the present configuration.

In the seventeenth aspect of the present invention, any one of the first aspect to the sixteenth aspect of the present invention may be configured such that, based on the color data acquired by the acquisition section, the determination section determines, as the display color of the second display image, a chromatic color with color characteristics different from the color characteristics of the first display image and also different from a chromatic color for a region based on the first image signal in the second display image and for a region based on the second image signal in the second display image. This thereby enables easier visible distinction in the second display image between the image based on the first image and image based on the second image than in cases not adopting the present configuration.

In an eighteenth aspect of the present invention, any one of the first aspect to the seventeenth aspect of the present invention may be configured such that, in cases in which a predetermined condition has been satisfied to make the color characteristics of the first display image and the color characteristics of the second display image close to each other, the determination section further determines, as the display color of the second display image, a color with color characteristics a predetermined degree near to the color characteristics of the first display image based on the color data acquired by the acquisition section. This thereby enables the boundary between the first display image and the second display image to be made less easy to visibly discern than in cases not adopting the present configuration.

In a nineteenth aspect of the present invention, any one of the first aspect to the eighteenth aspect of the present invention may be configured such that the image pick-up device includes a third pixel group that outputs a third image signal of a subject-image formed as an image without being pupil-divided, and the first display image generation section generates the first display image based on the third image signal output from the third pixel group. This thereby enables the quality of the first display image to be improved compared to cases not adopting the present configuration.

A twentieth aspect of the present invention includes the image processing device of any one of the first aspect to the nineteenth aspect of the present invention, and a storage section that stores images output from the image pick-up device. This thereby enables the visibility of the boundary line between the first display image and the second display image to be improved compared to cases not adopting the present configuration.

An image processing method according to a twenty-first aspect of the present invention includes: a first display image generation process that generates a first display image, based on an image signal output from an image pick-up device including first and second pixel groups on which respective images are formed by a pupil-divided subject-image that has passed through first and second regions of an imaging lens; a second display image generation process that generates a second display image for use in focus-checking based on first and second image signals output from the first and second pixel groups; an acquisition process that acquires color data of the first display image generated by the first display image generation process; a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image. This thereby enables the visibility of the boundary line between the first display image and the second display image to be improved compared to cases not adopting the present configuration.

In order to achieve the above objective, a non-transitory computer-readable storage medium storing a program for causing a computer to function as: the first display image generation section, the second display image generation section, the acquisition section, the determination section, and the display controller of the image processing device of any one of the first aspect to the ninth aspect of the present invention. This thereby enables the visibility of the boundary line between the first display image and the second display image to be improved compared to cases not adopting the present configuration.

The present invention achieves the advantageous effect of enabling the visibility of the boundary line between the first display image and the second display image to be improved.

BRIEF DESCRIPTION OF DRAWINGS

FIG. 7 is a schematic layout diagram illustrating an example of placement of light-blocking members provided to an image pick-up device included in an imaging device according to the first exemplary embodiment.

DESCRIPTION OF EMBODIMENTS

Explanation follows regarding an example of an exemplary embodiment of an imaging device according to the present invention, with reference to the drawings.

First Exemplary Embodiment

Figure 1:
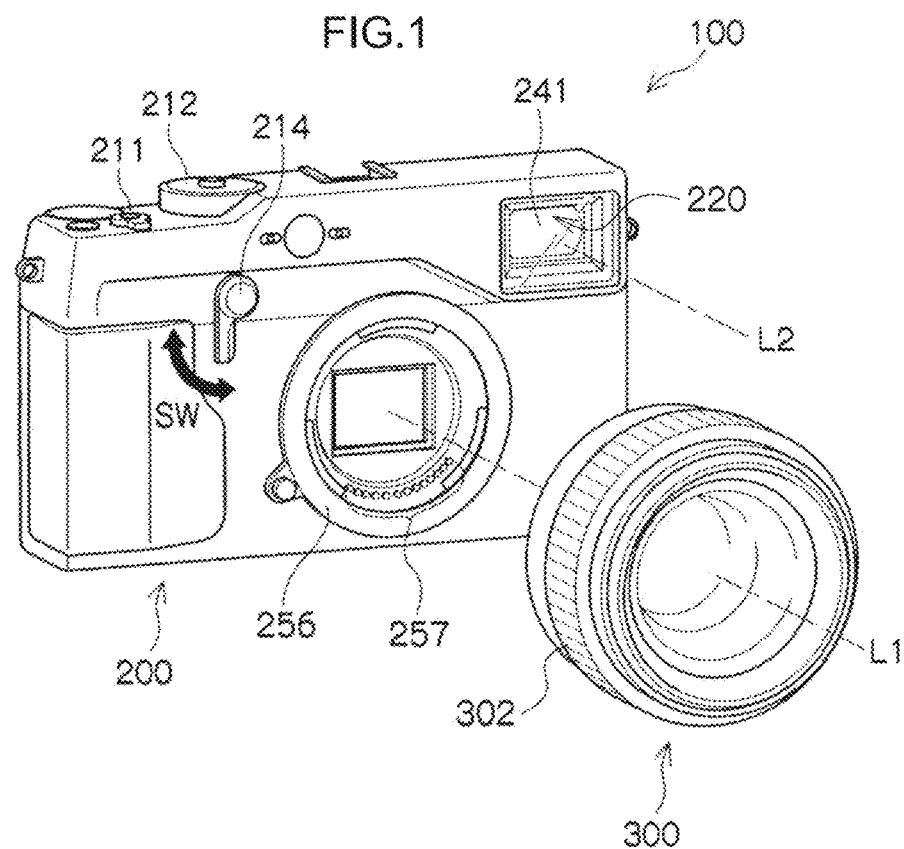
FIG. 1 is a perspective view illustrating an example of an imaging device that is an external appearance of an interchangeable lens camera according to a first exemplary embodiment.
Figure 2:
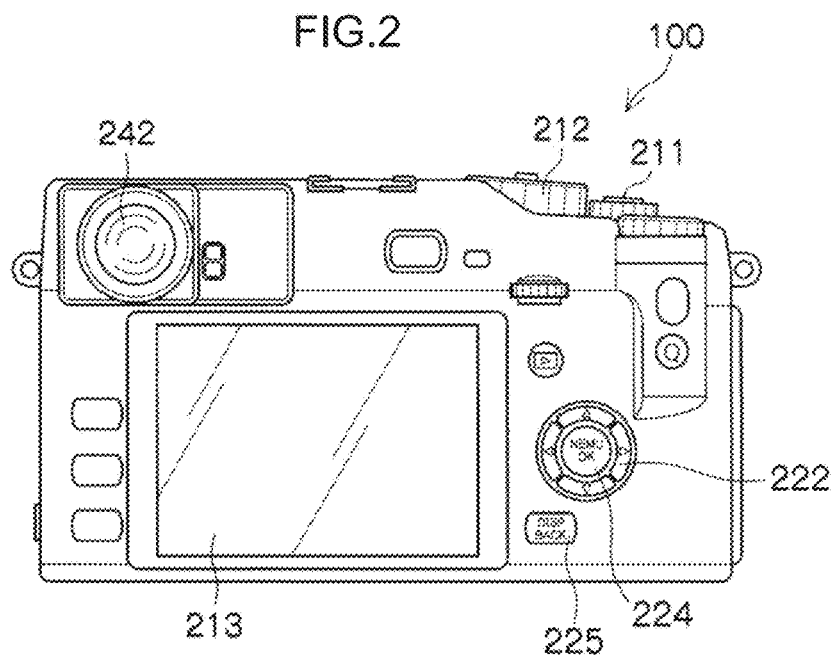
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera, and is a digital camera with a camera body 200 and an interchangeable lens 300 (imaging lens, focusing lens 302 (manual operation section)) that is interchangeably mounted to the camera body 200, and without a reflex mirror. A HYBRID FINDER® 220 is also provided to the camera body 200. HYBRID FINDER 220 indicates, for example, a finder selectively operated as an optical viewfinder (referred to as "OVF" below), or as an electronic viewfinder (referred to as "EVF" below).

The camera body 200 and the interchangeable lens 300 are mounted interchangeably by coupling a mount 256 provided to the camera body 200 together with a mount 346 (see FIG. 3) provided on the interchangeable lens 300 side to correspond to the mount 256.

An OVF finder window 241 included in the HYBRID FINDER 220 is provided on the front face of the camera body 200. A finder switching lever (finder switching section) 214 is provided on the front face of the camera body 200. Switching is performed (described below) between an optical image visible with the OVF and an electronic image visible with the EVF (live-view image) by turning the finder switching lever 214 in the directions of the arrows SW. The optical axis L2 of the OVF is different from the optical axis L1 of the interchangeable lens 300. The top face of the camera body 200 is mainly provided with a release button 211 and a dial 212 to set imaging mode, replay mode, and the like.

The back face of the camera body 200 is provided with an OVF finder eyepiece 242, a display section 213, a cross-key 222, a MENU/OK key 224, and a BACK/DISP button 225.

The cross-key 222 functions as a multifunction key to output various instruction signals, such as to select a menu, zoom, and to advance frames. The MENU/OK key 224 is an operation key that functions as a menu button to instruct display of a menu on the screen of the display section 213, and also doubles as an OK button function to confirm selected content, to instruct execution, or the like. The BACK/DISP button 225 is used to erase a desired object, such as a selected item, erase specified content, or return to the one-previous operation state.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction for still image capture has been given. Moreover, the display section 213 may be employed to display a reproduced image in a reproduction mode, and to display menu screens and the like.

Figure 3:
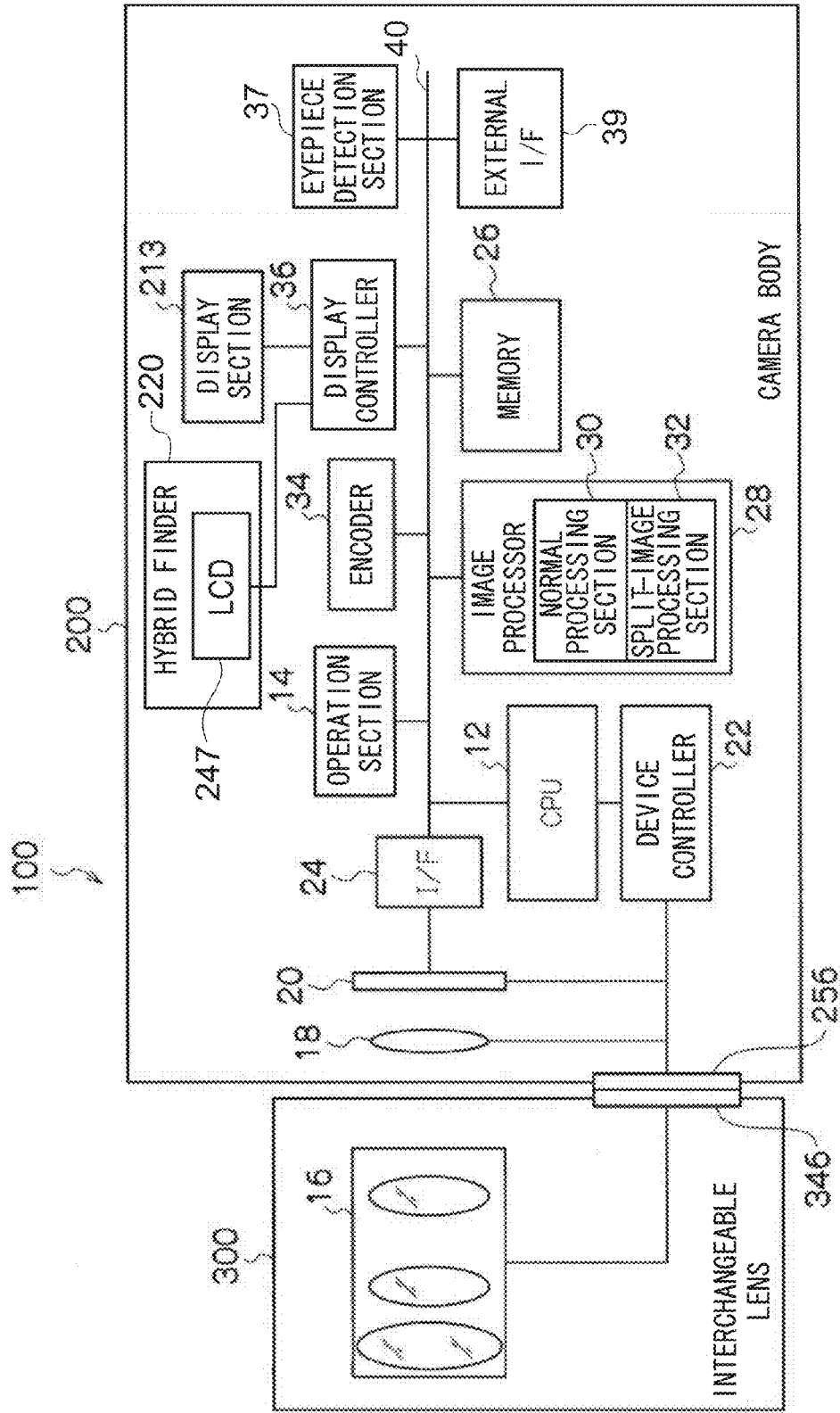
FIG. 3 is a block diagram illustrating an example of a configuration of an electrical system of an imaging device according to the first exemplary embodiment.

FIG. 3 is a block diagram illustrating an example of a configuration (internal configuration) of an electrical system of the imaging device 100 according to the first exemplary embodiment.

The imaging device 100 is a digital camera that records captured still images and video images, and the overall operation of the camera is integrally controlled by a Central Processing Unit (CPU) 12. In addition to the CPU 12, the imaging device 100 also includes an operation section 14, an interface section 24, a memory 26, an encoder 34, a display controller 36, and an eyepiece detection section 37. The imaging device 100 includes an image processor 28 that is an example of a first display image generator, a second display image generator, an acquisition section, a determination section, and an estimation section. The CPU 12, the operation section 14, the interface section 24, the memory 26 that is an example of a storage section, the image processor 28, the encoder 34, the display controller 36, the eyepiece detection section 37, and an external interface (I/F) 39 are connected to each other through a bus 40. The memory 26 includes a non-volatile storage region (for example EEPROM or the like) stored with parameters, programs, and the like, and a volatile storage region (for example SDRAM or the like) temporarily stored with various data related to images and the like.

The operation section 14 includes the release button 211, the dial (focus mode switching section) 212 to select the imaging mode and the like, the display section 213, the finder switching lever 214, the cross-key 222, the MENU/OK key 224, and the BACK/DISP button 225. The operation section 14 also includes a touch panel to receive various data. The touch panel, for example, overlays the display screen of the display section 213. Various operation signals output from the operation section 14 are input to the CPU 12.

When the imaging mode has been set, image light from an imaging subject is formed as an image on a light receiving face of a color image pick-up device (for example a CMOS sensor) 20 through the imaging lenses 16 that include a focus lens that is movable by manual operation and a shutter 18. The signal charges accumulated in the image pick-up device 20 are read in sequence as digital signals according to the signal charges (voltage) by a read signal applied from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
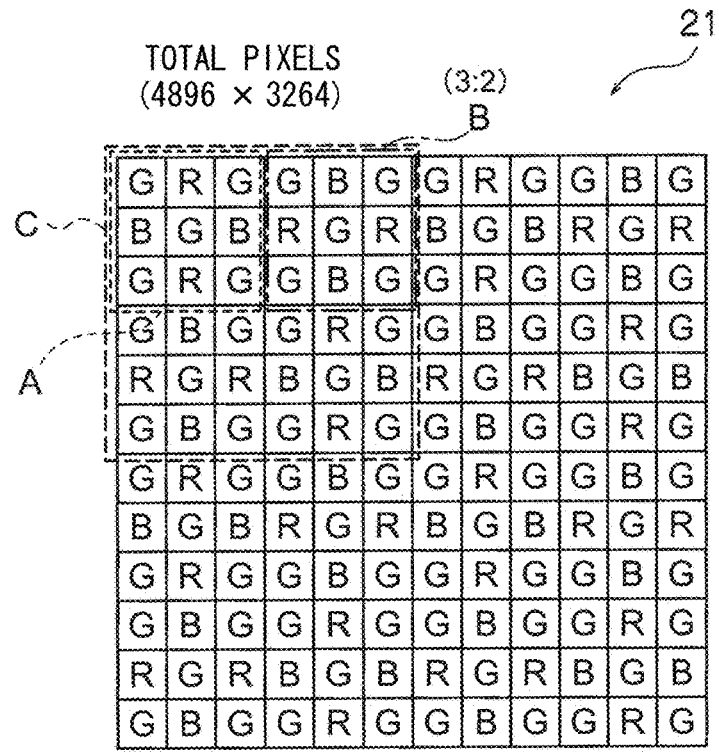
FIG. 4 is a schematic layout diagram illustrating an example of an array of a color filter provided to the image pick-up device included in an imaging device according to the first exemplary embodiment.

FIG. 4 schematically illustrates an example of an array of a color filter 21 provided to the image pick-up device 20. In the example illustrated in FIG. 4, (4896×3264) pixels are employed as an example of the number of pixels, and 3:2 is applied as the aspect ratio; however, the number of pixels and the aspect ratio are not limited thereto. As in the example of FIG. 4, the color filter 21 includes a first filter G corresponding to green (G) that contributes most to obtaining the brightness signal, a second filter R corresponding to red (R), and a third filter B corresponding to blue (B). The array patter of the first filter G (referred to below as G filter), the second filter R (referred to below as R filter), and the third filter B (referred to below as B filter) is classified into a first array pattern A and a second array pattern B.

In the first array pattern A, the G filter is placed on the 4 corner pixels and center pixel of a 3×3 pixel square array. In the first array pattern A, the R filter is placed in the vertical line at the horizontal direction center of the square array. In the first array pattern A, the B filter is placed in the horizontal line at the vertical direction center of the square array. In the second array pattern B, the placement of the filter G is the same as that of the first array pattern A, and the placement of the filter R and the placement of the B filter are in a swapped over pattern thereto. The color filter 21 includes a basic array pattern C formed from a square array pattern corresponding to 6×6 pixels. The basic array pattern C is a 6×6 pixel pattern disposed with the first array pattern A and the second array pattern B so as to have point symmetry, with the basic array pattern C disposed repeating in both the horizontal direction and the vertical direction. Namely, in the color filter 21 each of the color filters R, G, B (the R filter, G filter, B filter) is arrayed with a specific periodicity. This thereby enables processing to be performed according to a repeating pattern during performing synchronization (interpolation) processing and the like on the R, G, B signals read from the color image pick-up device.

Moreover, when images are reduced by thinning processing in basic array pattern C units, the color filter array of the thinning processed reduced image can be made similar to the color filter array prior to thinning processing, enabling a common processing circuit to be employed.

The color filter 21 has the G filter corresponding to the color contributing the most to obtaining a brightness signal (the color G in the first exemplary embodiment), placed in each line in the horizontal direction, vertical direction and diagonal directions of the color filter array. This thereby enables the reproduction precision of synchronization processing to be raised in the high frequency region, irrespective of the high frequency direction.

In the color filter 21, the R filter and the B filter corresponding to the two or more other colors other than the G color (the R and B colors in the first exemplary embodiment) are placed in each line in the horizontal direction and vertical direction of the color filter array. This thereby enables color moiré (false color) generation to be suppressed, thereby enabling an optical low pass filter for suppressing false color generation to be omitted from placement on the optical path of the optical system from the incident face to the imaging plane. Moreover, even in cases in which an optical low pass filter is employed, one can be employed that has a weak action to cut the high frequency components to prevent false color generation, enabling deterioration of resolution to be avoided.

The basic array pattern C can be considered as an array of alternate first array pattern A and second array pattern B in the horizontal direction and vertical direction, wherein the first array pattern A is the 3×3 pixels surrounded by the frame of the broken line, and the second array pattern B is the 3×3 pixels surrounded by the frame of the single dot intermittent line.

The first array pattern A and the second array pattern B both have the G filters that are the respective brightness system pixels placed at their 4 corners and center, so as to be placed along their two diagonals. Moreover, in the first array pattern A, the B filters are arrayed in the horizontal direction on each side of the central G filter, and the R filters are arrayed in the vertical direction on each side of the central G filter. However, in the second array pattern B, the R filters are arrayed on each side of the central G filter in the horizontal direction, and the B filters are arrayed in the vertical direction on each side of the central G filter. Namely, the first array pattern A and the second array pattern B have reverse positional relationships to each other for the R filters and the B filters, but have the same placement otherwise.

Figure 5:
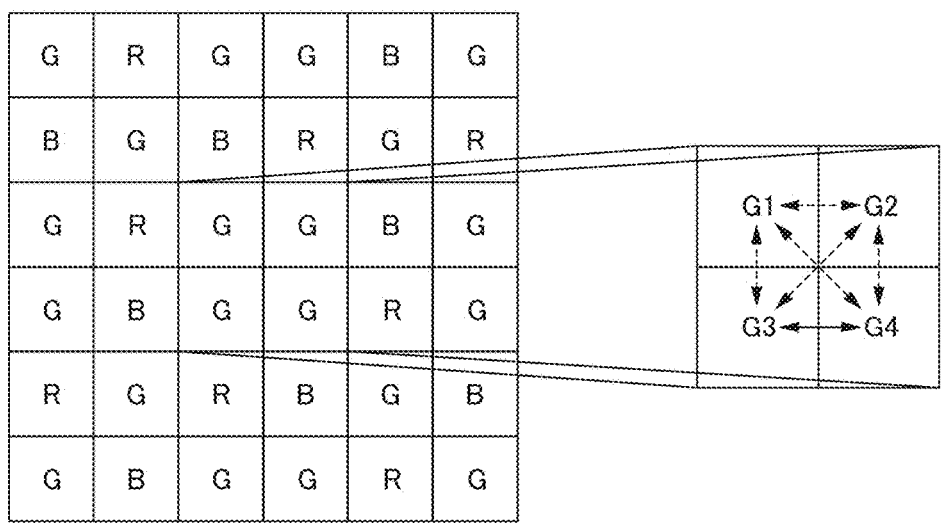
FIG. 5 is a diagram to accompany explanation of a method to determine correlation direction from pixel values of 2 by 2 G pixels included in the color filter illustrated in FIG. 4.

Moreover, the G filters at the 4 corners of the first array pattern A and the second array pattern B configure G filters that are arrayed in a square array corresponding to 2×2 pixels by disposing the first array pattern A and the second array pattern B alternately along the horizontal and vertical directions as illustrated in the example in FIG. 5. By extracting the 2×2 pixels formed from the G filters as illustrated in the example in FIG. 5, the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left) are computed. This thereby enables determination that there is correlation in the direction with the smallest difference in absolute value out of the horizontal direction, vertical direction and diagonal directions. Namely, the direction with the highest correlation out of the horizontal direction, vertical direction, and diagonal directions is determined by employing the data of the G pixels with the smallest pixel separation. This determination result can then be employed in interpolation processing from the peripheral pixels (synchronization processing).

The placement in the basic array pattern C of the color filter 21 has point symmetry about the center of the basic array pattern C (the center of the 4 G filters). Moreover, the first array pattern A and the second array pattern B inside the basic array pattern C also each have respective point symmetry about the G filters at their respective centers, enabling the circuit scale of a later stage processing circuit to be made smaller and to be simplified.

Figure 6:
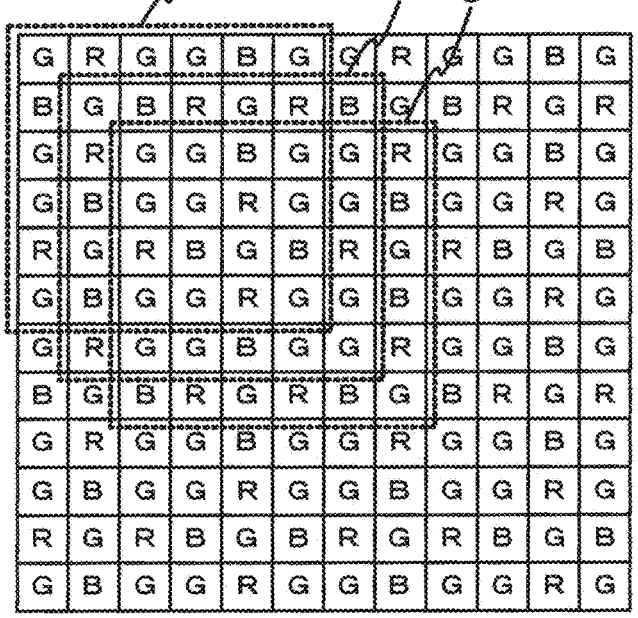
FIG. 6 is a diagram to explain the principle of a basic array pattern including the color filter illustrated in FIG. 4.

In the basic array pattern C illustrated as an example in FIG. 6, the color filter arrays of the first and third lines out of the first to sixth horizontal direction lines are GRGGBG. The color filter array of the second line is BGBRGR. The color filter arrays of the fourth and sixth lines are GBGGRG. The color filter array of the fifth line is RGRBGB. In the example illustrated in FIG. 6, basic array patterns C, C', C" are illustrated. The basic array pattern C' is the basic array pattern C shifted respectively by 1 pixel each in the horizontal direction and vertical direction. The basic array pattern C" is the basic array pattern C shifted respectively by 2 pixels each in the horizontal direction and vertical direction. Thus in the color filter 21, the same color filter array results even if it is the basic array patterns C', C" that are repeatedly disposed along the horizontal direction and vertical direction. In the first exemplary embodiment, the basic array pattern C is, for convenience, referred to as the basic array pattern.

Figure 7:
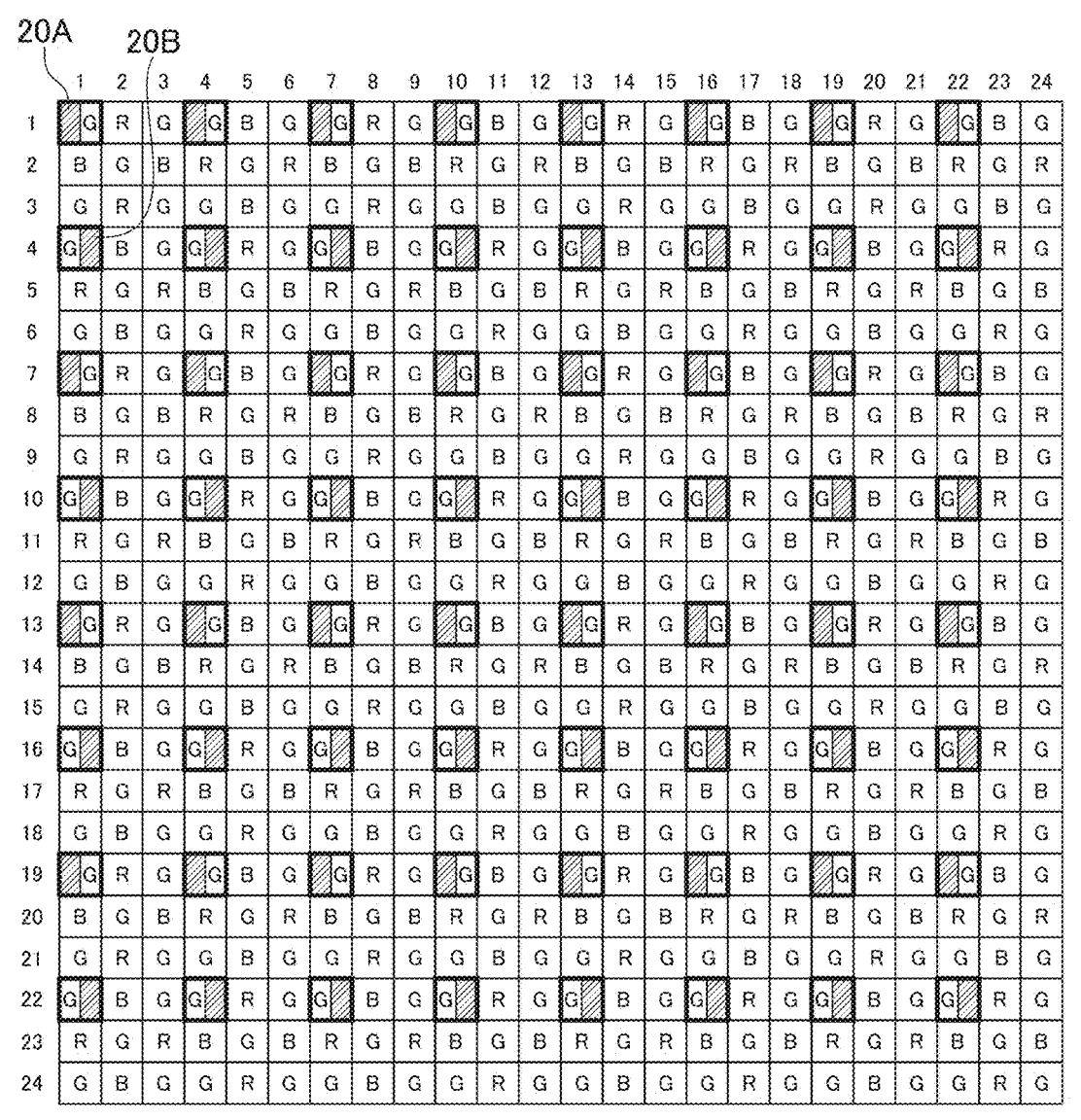

The imaging device 100 includes a phase difference AF function. The image pick-up device 20 includes plural phase difference detection pixels employed to operate the phase difference AF function. The plural phase difference detection pixels are arrayed in a predetermined pattern. Light-blocking members 20A that block light to the horizontal direction left half of a pixel, and light-blocking members 20B that block light to the horizontal direction right half of a pixel, are provided on the phase difference detection pixels, as illustrated in the example of FIG. 7. In the first exemplary embodiment, for ease of explanation, the phase difference detection pixels provided with the light-blocking members 20A are referred to as "first pixels", and the phase difference detection pixels provided with the light-blocking members 20B are referred to as "second pixels". They are referred to as "phase difference pixels" when there is no need to discriminate between the first pixels and the second pixels.

Figure 8:
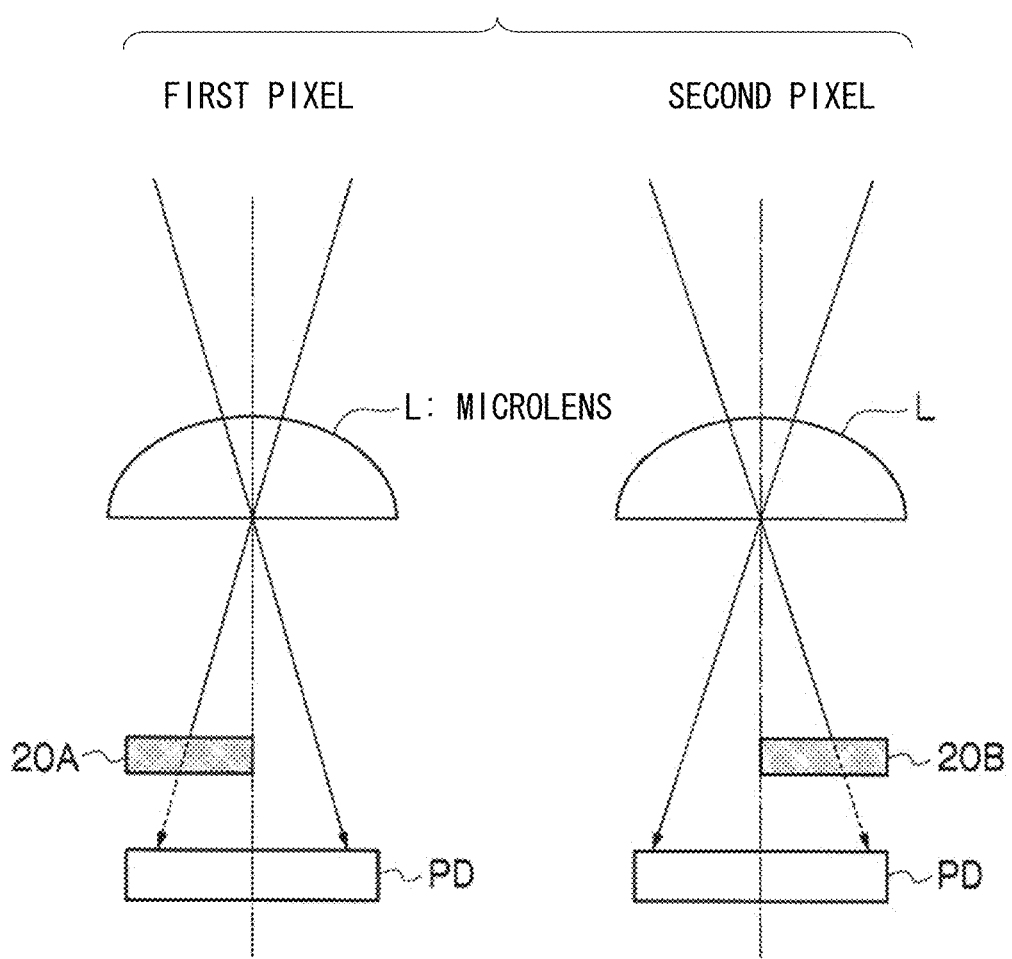
FIG. 8 is a schematic configuration diagram illustrating an example of a configuration of phase difference pixels (a first pixel and a second pixel) included in an image pick-up device of an imaging device according to the first exemplary embodiment.

An example of the first pixels and the second pixels placed in the image pick-up device 20 is illustrated in FIG. 8. The first pixels illustrated in FIG. 8 include the light-blocking members 20A, and the second pixels therein include the light-blocking members 20B. The light-blocking members 20A are provided at the front face side of a photodiode PD (microlens L side), and block light to the left half of the light receiving faces. The light-blocking members 20B are provided at the front face side of a photodiode PD, and block light to the right half of the light receiving faces.

The microlens L and the light-blocking members 20A, 20B function as a pupil divider, and the first pixels receive light only from light rays passing through an exit pupil of imaging lenses 16 on the left side of the optical axis, the second pixels receive light only from light rays passing through the exit pupil of the imaging lenses 16 on the right side of the optical axis. Thus the light rays passing through the exit pupil are divided to the left and right by the microlens L and the light-blocking members 20A, 20B serving as a pupil divider, and are respectively incident to the first pixels and the second pixels.

Portions in-focus (in a focused state) out of the subject-image corresponding to the light rays of the left half and the subject-image corresponding to the light rays on the right half among the light rays passing through the exit pupil of the imaging lenses 16 are focused at the same position on the image pick-up device 20. Conversely, portions in front of focus or behind focus are incident to different respective positions on the image pick-up device 20 to each other (with displaced phase). This thereby enables a parallax image (left eye image, right eye image) to be acquired with different parallax for the subject-image corresponding to the light rays of the left half, and the subject-image corresponding to the light rays of the right half.

The imaging device 100 detects a phase displacement amount based on pixel values of the first pixels and pixel values of the second pixels by operating the phase difference AF function. The focal position of the imaging lens is then adjusted according to the detected phase displacement amount. Note that in the following, reference numerals are not appended when explanation does not need to discriminate between the light-blocking members 20A, 20B and they are referred to collectively as "light-blocking members".

In the first exemplary embodiment, the light-blocking members are, as illustrated in the example of FIG. 7, provided to the G filter pixels at the top left corner of the two pairs of the first array pattern A and the second array pattern B contained in the basic array pattern C. Namely, as illustrated in the example of FIG. 7, in the vertical direction, the light-blocking members 20A are placed in the $(6n+1)^{th}$ line, and the light-blocking members 20B are placed in the $(6n+4)^{th}$ line, wherein n is an integer of 0 or greater. In the example illustrated in FIG. 7, the light-blocking members are provided in all the basic array patterns C; however, there is no limitation thereto, and they may be provided only in some of the basic array patterns C in a specific region of the image pick-up device 20.

Thus in the color filter 21, the light-blocking members are provided to the top left corner G filter pixels of all the first array patterns A and second array patterns B, with the phase difference pixels placed periodically at 1 pixel every 3 pixels in the vertical direction and horizontal direction. Thus, since there are comparatively many normal pixels placed at the periphery of the phase difference pixels, the interpolation precision can be raised in cases in which pixel values of the phase difference pixels are interpolated from the pixel values of the normal pixels. "Normal pixels" referred to above indicate, for example, pixels other than the phase difference pixels (for example pixels that do not include the light-blocking members 20A, 20B).

The image pick-up device 20 is classified into a first pixel group, a second pixel group, and a third pixel group. The first pixel group indicates, for example, the plural first pixels. The second pixel group indicates, for example, the plural second pixels. The third pixel group indicates, for example, the plural normal pixels. In the following a RAW image output from the first pixel group is referred to as a "first image", a RAW image output from the second pixel group is referred to as a "second image", and a RAW image output from the third pixel group is referred to as a "third image".

Returning to FIG. 3, the image pick-up device 20 outputs the first image (digital signal representing the pixel values of each of the first pixels) from the first pixel group, and outputs the second image (digital signal representing the pixel values of each of the second pixels) from the second pixel group. The image pick-up device 20 outputs the third image (digital signal representing the pixel values of each of the normal pixels) from the third pixel group. The third image output from the third pixel group is a chromatic image, and is, for example, a color image with the same color array as the array of the normal pixels. The first image, the second image, and the third image output from the image pick-up device 20 are temporarily stored in the volatile storage region in the memory 26 through the interface section 24.

The image processor 28 includes a normal processing section 30. The normal processing section 30 generates a chromatic normal image (an example of a first display image) by processing the R, G, B signals corresponding to the third pixel group. The image processor 28 also includes a split-image processing section 32. The split-image processing section 32 generates achromatic split-images by processing the G signals corresponding to the first pixel group and the second pixel group. The image processor 28 according to the first exemplary embodiment is implemented by an Application Specific Integrated Circuit (ASIC) that is a single integrated circuit combining multiple function circuits related to image processing. However, hardware configuration is not limited thereto, and, for example, configuration may be made with other hardware, such as a computer including a programmable logic device and CPU, ROM, and RAM.

The encoder 34 converts an input signal into a signal of another format and outputs the converted signal. The HYBRID FINDER 220 includes an LCD 247 that displays an electronic image. The number of pixels in a specific direction in the LCD 247 (for example the number of pixels in the horizontal direction that is the parallax generation direction), is less than the number of pixels in the same direction of the display section 213. The display controller 36 is connected to the display section 213 and the LCD 247, and displays images on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus mode and an autofocus mode using the dial 212 (the focus mode switching section). When the manual focus mode has been selected, the display controller 36 displays on the display devices a live-view image onto which the split-images have been synthesized. However, when the autofocus mode has been selected by the dial 212, the CPU 12 operates as a phase difference detection section and an automatic focus adjusting section. The phase difference detection section detects the phase difference between the first image output from the first pixel group and the second image output from the second pixel group. The automatic focus adjusting section controls a lens drive section (not illustrated in the drawings) from the device controller 22 through the mounts 256, 346, based on the detected phase displacement, to move the focal position of the imaging lenses 16 such that the defocus amount of the imaging lenses 16 becomes zero. The "defocus amount" referred to above indicates, for example, a phase displacement amount between the first image and the second image.

The eyepiece detection section 37 detects a person (for example a photographer) looking into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is controlled through the communication network. When connected to a printer as an external device, the imaging device 100 is accordingly capable of outputting captured still images to a printer and printing. When connected to a display as an external device, the imaging device 100 is capable of outputting captured still images and live-view images to a display, and displaying thereon.

Figure 9:
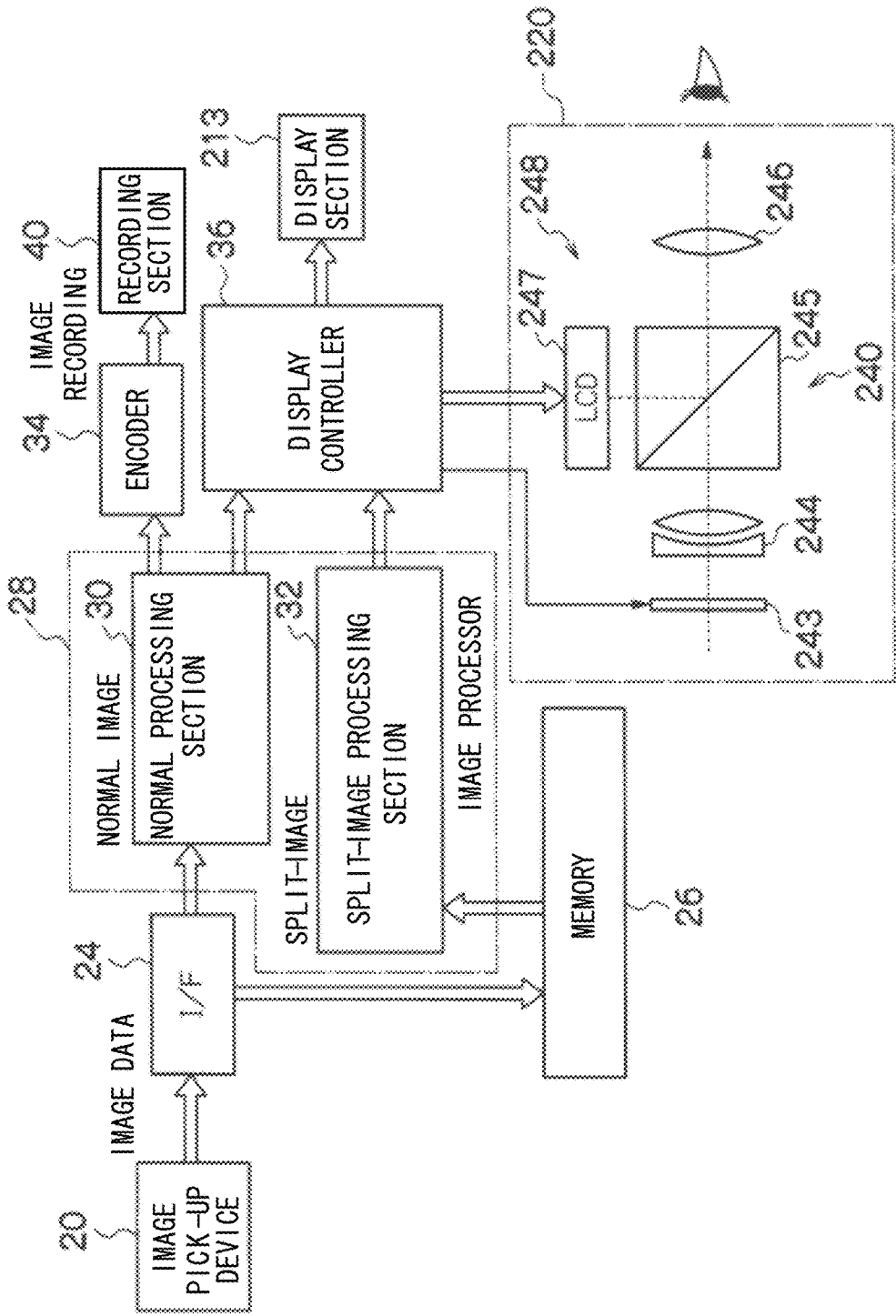
FIG. 9 is a block diagram illustrating an example of relevant functions of an imaging device according to the first exemplary embodiment.

FIG. 9 is a functional block diagram illustrating an example of relevant functions of the imaging device 100 according to the first exemplary embodiment. Common portions to the block diagram illustrated in FIG. 3 are appended with the same reference numerals.

The normal processing section 30 and the split-image processing section 32 each include a WB gain section, a gamma correction section, and a synchronization processing section (not illustrated in the drawings), and perform serial signal processing in each of the processing sections on the digital signals (RAW images) originally temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processing section performs color interpolation processing on the color filter array of the image pick-up device 20 (in this example a Bayer array), and generates synchronized R, G, B signals. The normal processing section 30 and the split-image processing section 32 perform parallel image processing on the RAW images each time one screen's worth of RAW image is acquired by the image pick-up device 20.

The normal processing section 30 is input with the R, G, B RAW images from the interface section 24, and uses the peripheral pixels of the same color from the first pixel group and the second pixel group (for example G pixels) to interpolate and generate the R, G, B pixels of the third pixel group. This thereby enables a normal image for recording to be generated based on the third image output from the third pixel group.

The normal processing section 30 outputs image data of the generated normal image for recording to the encoder 34. The R, G, B signals processed by the normal processing section 30 are converted (encoded) by the encoder 34 into a recording signal and recorded in a recording section. Moreover, a normal image for display that is an image based on the third image processed by the normal processing section 30 is output to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and thereby capable of acquiring images under different exposure conditions at the same time. Consequently, the image processor 28 is capable of generating images over a wide dynamic range based on the images under different exposure conditions. Moreover, due to being able to acquire plural images under the same exposure conditions at the same time, adding these images together enables a high sensitivity image with little noise to be generated, or a high resolution image to be generated.

The split-image processing section 32 extracts the G signals of the first pixel group and the second pixel group from the RAW image temporarily stored in the memory 26, and generates an achromatic split-image based on the G signals of the first pixel group and the second pixel group. Each of the first pixel group and the second pixel group extracted from the RAW image are pixel groups from the G filter pixels as described above. The split-image processing section 32 is accordingly able to generate an achromatic left parallax image and an achromatic right parallax image based on the G signals of the first pixel group and the second pixel group. In the following, for convenience of explanation, the above "achromatic left parallax image" is referred to as the "left eye image", and the above "achromatic right parallax image" is referred to above the "right eye image".

The split-image processing section 32 synthesizes the left eye image based on the first image output from the first pixel group together with the right eye image based on the second image output from the second pixel group to generate a split-image. Image data of the generated split-image is output to the display controller 36.

Figure 11:
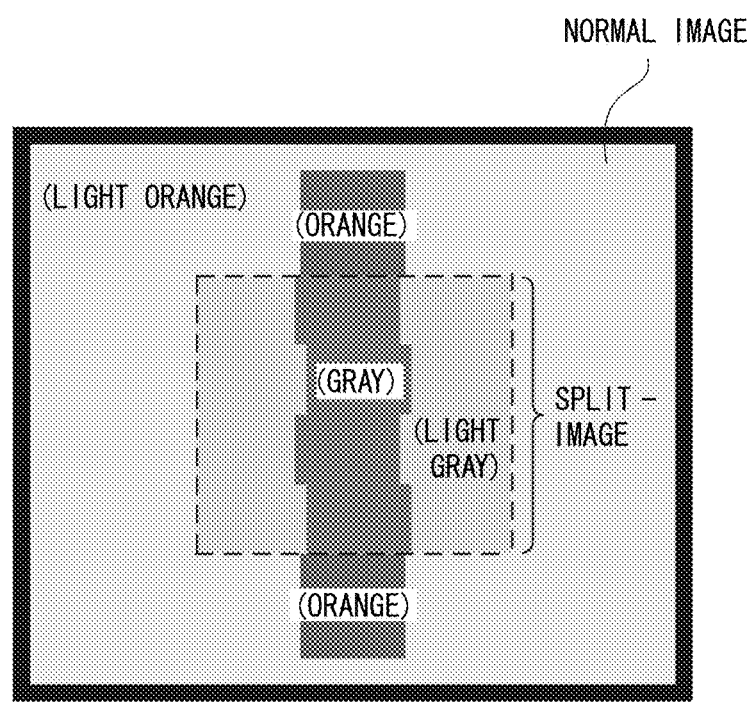
FIG. 11 is a screen shot diagram illustrating an example of a normal image and a split-image in a live-view image displayed on a display device as a Comparative Example to the first exemplary embodiment.

The display controller 36 generates image data for display based on the image data for recording corresponding to the third pixel group input from the normal processing section 30, and image data of the split-image corresponding to the first and second pixel groups input from the split-image processing section 32. For example, the display controller 36 synthesizes a split-image represented by image data input from the split-image processing section 32 onto a display region of a normal image represented by image data for recording corresponding to the third pixel group input from the normal processing section 30. The image data obtained by synthesizing is then output to the display section 213. The split-image generated by the split-image processing section 32 is a multi-division image in which a portion of the left eye image and a portion of the right eye image are synthesized together. The split-image illustrated in FIG. 11 is given as an example of what is referred to as "a multi-division image". The split-image illustrated in FIG. 11 is an image from synthesizing together a portion of a left eye image and a portion of a right eye image at a position corresponding to the position of a specific region on the display section 213, and is an image in which 4 images divided in the up-down direction are displaced from each other in a specific direction (for example the parallax generation direction) according to the focus state. The form of the split-image is not limited to the example illustrated in FIG. 11, and may be a synthesized image from an upper half image from the left eye image and a lower half image from the right eye image. In such cases, the upper and lower images divided into 2 are displaced from each other in the specific direction (for example the parallax generation direction) according to the focus state.

The method for synthesizing the split-image onto the normal image is not limited to the synthesis method in which the split-image is fitted in place of an image of a portion of a normal image. For example, a synthesis method may be employed in which the split-image is superimposed on the normal image. Moreover, a synthesis method may be employed in which transparencies, of the image of a portion of a normal image onto which the split-image is to be superimposed and of the split-image, are appropriately adjusted for superimposition. In this manner the live-view image illustrating the imaging subject that is successively captured is displayed on the screen of the display section 213, and the displayed live-view image is an image in which the split-image is displayed within a display region of the normal image.

The HYBRID FINDER 220 includes an OVF 240 and an EVF 248. The OVF 240 is a reverse Galileo finder including an object lens 244 and an eyepiece lens 246, and the EVF 248 includes the LCD 247, a prism 245, and the eyepiece lens 246.

A liquid crystal shutter 243 is overlaid at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made between the OVF mode that enables a visual check to be made on an optical image using the OVF 240 at each turn, and the EVF mode that enables a visual check to be made on the electronic image using the EVF 248.

In the OVF mode, the display controller 36 controls so that the liquid crystal shutter 243 is in a non-light blocking state, enabling a visual check to be made on an optical image through the eyepiece section. Moreover, only the split-image is displayed on the LCD 247. This thereby enables a finder image in which the split-image is superimposed on a portion of the optical image to be displayed.

In the EVF mode, the display controller 36 controls so that the liquid crystal shutter 243 is in a light blocking state, enabling a visual check to be made on an electronic image displayed alone on the LCD 247 from the eyepiece section. Similar image data to the image data synthesized with the split-image for output on the display section 213 is input to the LCD 247, thereby enabling the electronic image synthesized with the split-image to be displayed on a portion of the normal image, similarly to with the display section 213.

Figure 10:
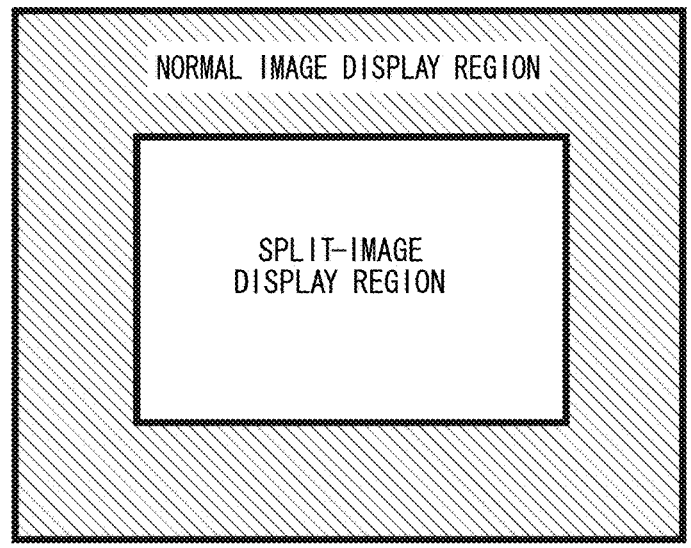
FIG. 10 is a schematic diagram illustrating an example of respective display regions of a normal image and a split-image in a display device of an imaging device according to the first exemplary embodiment.

FIG. 10 illustrates an example of a display region for each of the normal image and the split-image on a display device. As illustrated in the example of FIG. 10, a split-image is displayed inside a rectangular frame at a screen central portion of the display device, and the normal image is displayed at the external peripheral region to the split-image. Note that the border lines representing the rectangular frames illustrated in FIG. 10 are illustrated in FIG. 10 for ease of explanation, and are not actually displayed.

FIG. 11 schematically illustrates an example of a normal image and a split-image displayed on the same screen of a display device as a Comparative Example to the first exemplary embodiment. As illustrated in the example of FIG. 11, the split-image is displayed achromatically, and the normal image is displayed chromatically. However, white balance of the screen overall does not raise the color of the split-image with respect to the color of the normal image, and a visual check on the boundary between the split-image and the normal image is difficult.

Thus in the imaging device 100 according to the first exemplary embodiment, the image processor 28 performs image output processing including processing to visually discriminate between the display color of the normal image and the display color of the split-image (referred to below as "display color differentiation processing"). The display color differentiation processing acquires the color data of the normal image, and includes processing that, based on the acquired color data, determines as the display color of the split-image a color with different color characteristics to the color characteristics of the normal image. The above "color data" indicates, for example, color data representing the color characteristics of the object color of the normal image. The above "color characteristics different from the color characteristics of the normal image" indicates, for example, color characteristics different from the color characteristics of the object color of the normal image. The above "color characteristics different from the color characteristics of the normal image" indicates, for example, a color a predetermined angle in a color circle away from the object color of the normal image. Reference here to "predetermined angle" indicates an angle predetermined as an angle to obtain a color with color characteristics visibly different from the color characteristics of the object color of the normal image. In such cases, the "predetermined angle" is preferably an angle of from 160° to 200°, more preferably from 170° to 190°, and most preferably 180° (the angle identifying the complementary color). There is no limitation thereto, and an angle specified by a user through the operation section 14 may be employed (for example an angle obtaining a color visible to the user). There is no limitation thereto, and, as the "predetermined angle", an angle determined based on evaluation results from sensory test with plural test imaging subjects may be employed. In such cases, an angle evaluated as having color characteristics different from the color characteristics of the object color of a normal image (sample image) by a majority of the plural test imaging subjects (for example having a hue different from the hue of the object color of the sample image) is given as an example employed as the "predetermined angle".

In the first exemplary embodiment, the configuration ratio of primary color components in the normal image after subjecting to WB may be employed as an example of the above "color characteristics of the object color of the normal image". Reference here to the "configuration ratio of primary color components" indicates, for example, a ratio of R, G, B pixel values, normalized to a sum of "1".

Figure 12:
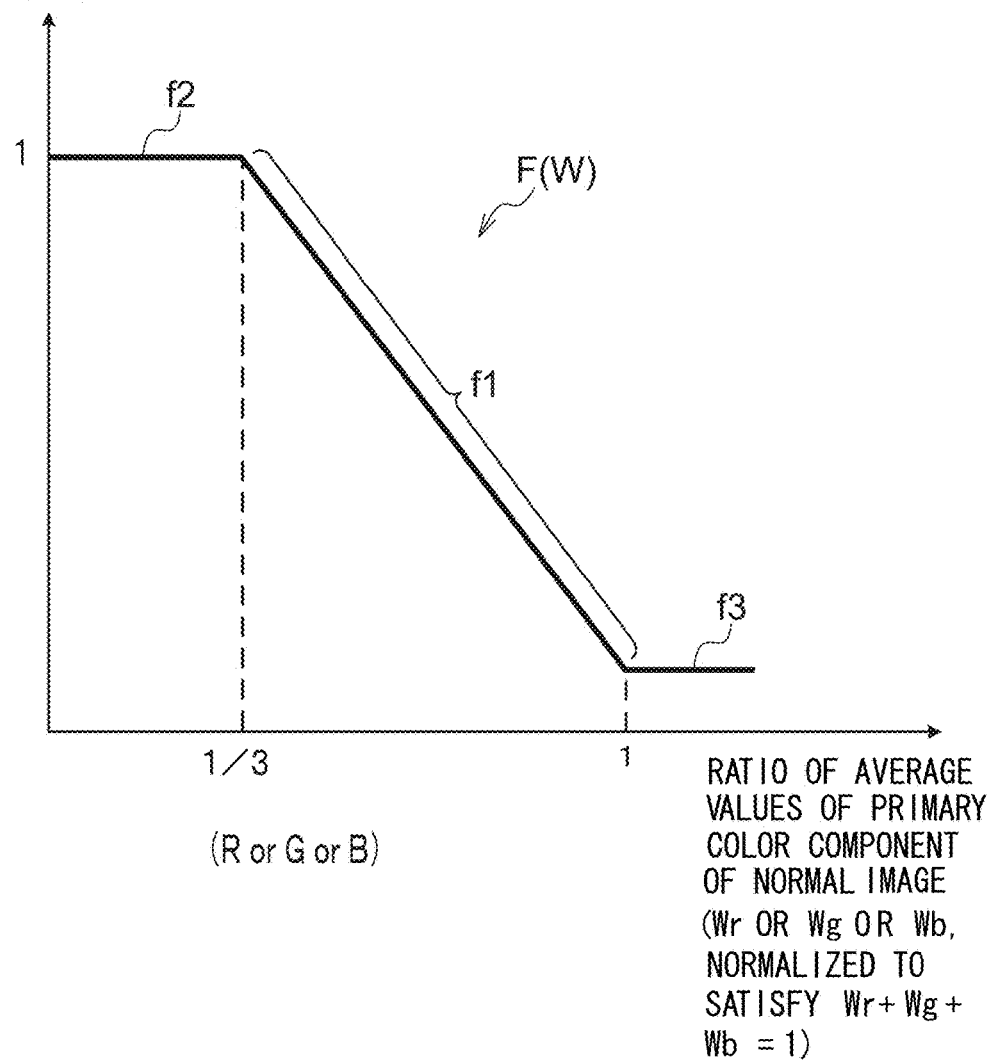
FIG. 12 is a graph illustrating an example of a first input-output function employed in an imaging device according to the first exemplary embodiment.

Moreover, a first input-output function F(W) illustrated in FIG. 12 may be employed, as an example, in the display color differentiation processing. The horizontal axis in FIG. 12 is the input value of the first input-output function F(W), and illustrates one component of the R, G, B configuration ratio in the normal image after subjecting to WB. Namely, average values of for each of the R, G, B pixel values in the normal image after subjecting to WB are indicated here on the horizontal axis. Normalization has been applied here such that (R average value Wr)+(G average value Wg)+(B average value Wb)=1. The vertical axis in FIG. 12 is the output value of the first input-output function F(W), and illustrates the R:G:B of each of the pixels of the split-image. According to the first input-output function F(W), if, for example, red dominates, as with an input of Wr:Wg:Wb=0.4:0.3:0.3, then the output would be R:G:B=0.8:1:1, and the split-image would be a bluey-greeny tone of gray. This thereby enables the visibility of the boundary line between the normal image and the split-image to be improved.

The first input-output function F(W) is a function that converts a configuration ratio of primary color components in a normal image after subjecting to WB into a configuration ratio of primary color components in a split-image. The first input-output function F(W) includes a function f1 that is a declining function (a function with characteristics to reduce the output value as the input value increases). The first input-output function F(W) illustrated in FIG. 12 includes as an example of a function f1 a linear function with negative slope. However, a non-linear function having characteristics to reduce the output value as the input value increases may be employed in place of a linear function. The first input-output function F(W) illustrated in FIG. 12 includes functions f2, f3 that are linear functions that are each contiguous to the function f1 and have a slope of zero. However, a non-linear function may be employed, or a linear function with a negative slope may be employed, in place of the functions f2, f3. Moreover, the first input-output function F(W) is a bent function (a function formed by combining the functions f1 to f3); however, there is no limitation thereto, and declining function with a monotonous reduction (for example y=−ax+b) may be employed therefor.

Figure 13:
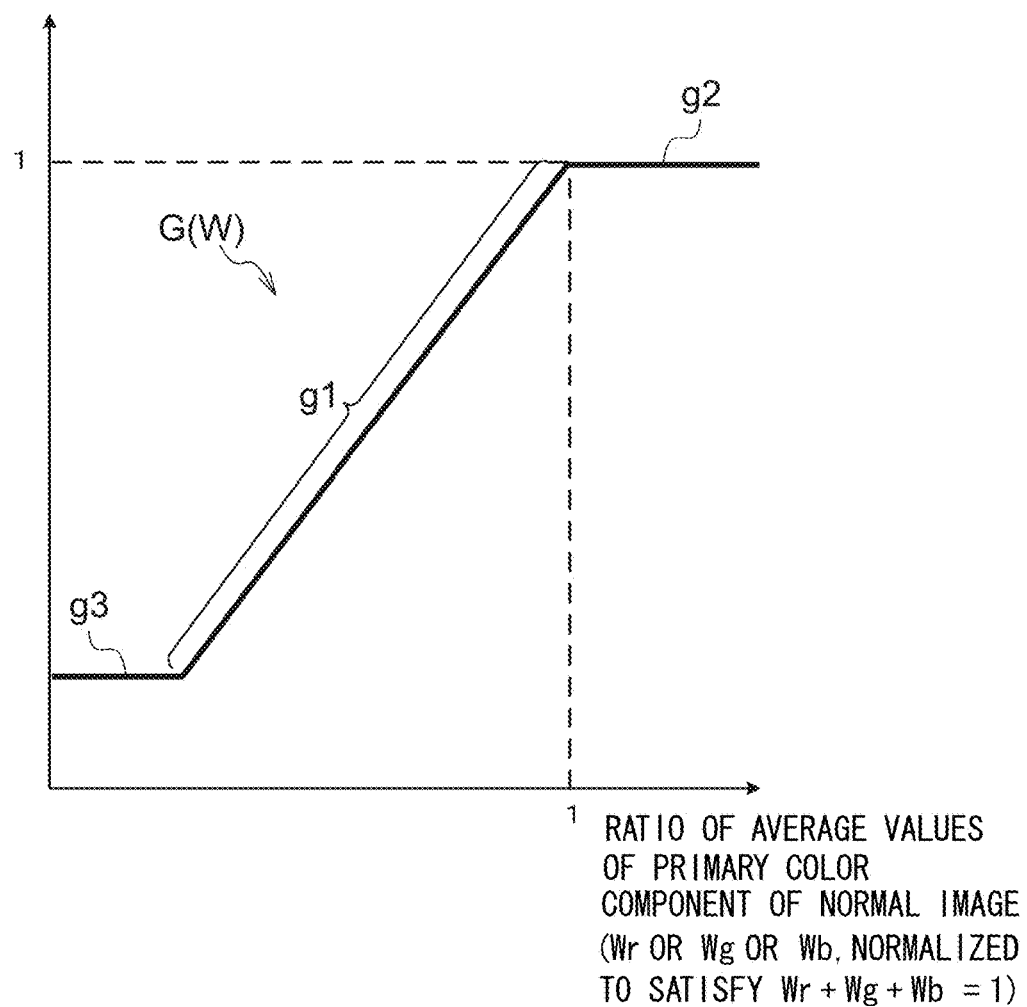
FIG. 13 is a graph illustrating an example of a second input-output function employed in an imaging device according to the first exemplary embodiment.

In the imaging device 100 according to the first exemplary embodiment, the image processor 28 performs processing to assimilate the display color of the normal image and the display color of the split-image by making the color characteristics of the normal image and the color characteristics of the split-image close to each other (referred to below as "display color assimilation processing"). In the display color assimilation processing, as an example, a second input-output function G (W) illustrated in FIG. 13 is employed. The input values of the second input-output function G (W) are shown on the horizontal axis of FIG. 13, and, similarly to the horizontal axis of FIG. 12, illustrates a component of the R, G, B configuration ratio in the normal image after subjecting to WB. The output values of the second input-output function G (W) are shown on the vertical axis of FIG. 13, and similarly to the vertical axis illustrated in FIG. 12, indicate a component of the R, G, B configuration ratio in the split-image.

The second input-output function G (W) also, similarly to the first input-output function F(W), is a function that converts a configuration ratio of primary color components in a normal image after subjecting to WB into a configuration ratio of primary color components in the split-image. However, the second input-output function G (W) is a symmetrical function to the first input-output function F(W) illustrated in FIG. 12, and includes functions g1, g2, g3.

The function g1 is an increasing function (a function in which the output value increases as the input value increases). The second input-output function G (W) illustrated in FIG. 13 includes a linear function with a positive slope as an example of function g1. However, a non-linear function with characteristics such that the output value increases as the input value increases may be employed in place of a linear function. The second input-output function G (W) illustrated in FIG. 13 includes functions g2, g3 that are linear functions that are each contiguous to the function g1 and have a slope of zero. However, a non-linear function may be employed, or a linear function with a positive slope may be employed, in place of the functions g2, g3. Moreover, the second input-output function G (W) is a bent function (a function formed by combining the functions g1 to g3); however, there is no limitation thereto, and an monotonous function that increases monotonously (for example y=ax+b) may be employed therefor.

The first input-output function F(W) and the second input-output function G (W) are stored in a specific storage region (for example the memory 26).

Figure 14:
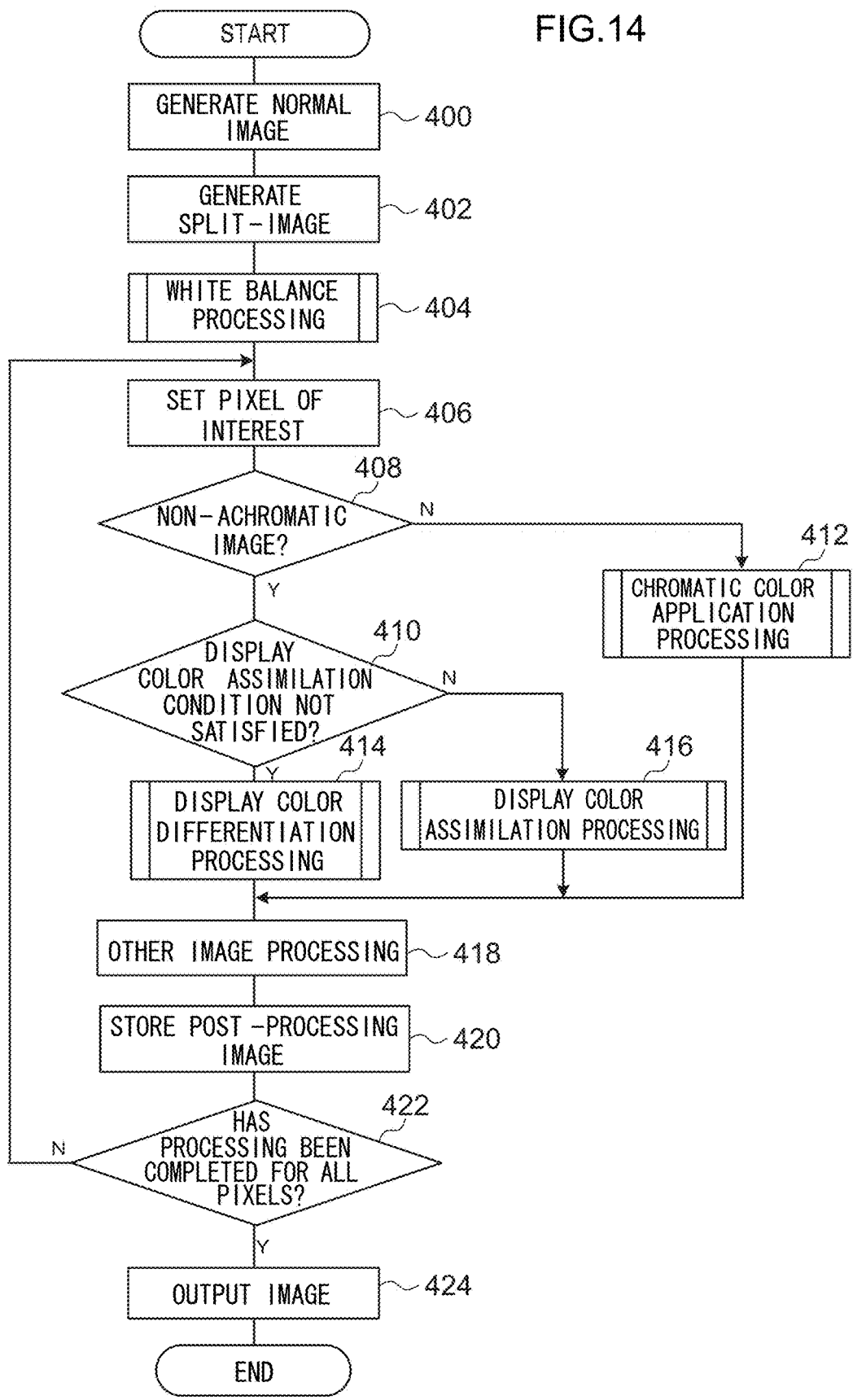
FIG. 14 is a flow chart illustrating an example of flow of image output processing performed by an image processor included in an imaging device according to the first exemplary embodiment.

Explanation next follows regarding the image output processing employed by the image processor 28 as employed in the first exemplary embodiment, with reference to FIG. 14. Note that in the example here, the image output processing is performed by the image processor 28, however the present invention is not limited thereto, and, for example, the image output processing may be performed in the imaging device 100 by the CPU 12 executing an image output processing program.

In FIG. 14, first, at step 400, a normal image is acquired by the image processor 28. The normal image acquired at step 400 is stored in a specific storage region (for example the memory 26) by the image processor 28. Then at step 402, a left eye image and a right eye image are acquired by the image processor 28, and a split-image is generated based on the acquired left eye image and right eye image.

Figure 15:
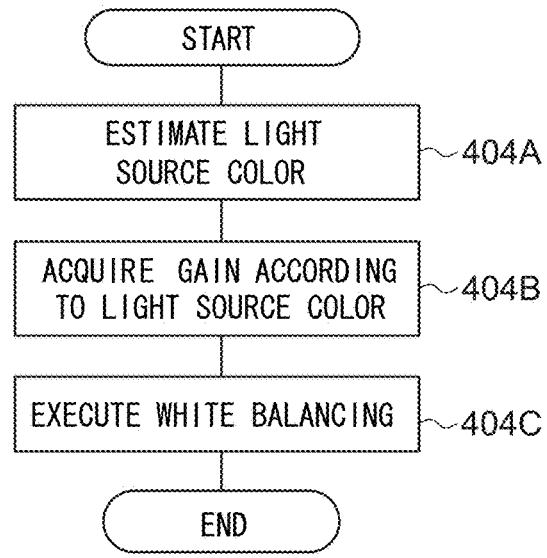
FIG. 15 is a flowchart illustrating an example of a flow of WB processing performed by an image processor included in an imaging device according to the first exemplary embodiment.

At the next step 404, WB processing is executed by the image processor 28. FIG. 15 illustrates an example of a flow of WB processing. At step 404A illustrated in FIG. 15, the color data is acquired from the normal image by the image processor 28, and the light source color at image capture is estimated based on the acquired color data. At the next step 404B, a gain corresponding to the light source color estimated at step 404A is acquired by the image processor 28 as the gain for each of the R, G, B colors employed in WB. In the first exemplary embodiment, for example, gain is determined for, respectively, sunlight on a sunny day, sunlight on a cloudy day, florescent lighting, and a tungsten light source (and for example, stored in the memory 26), and the light source gain corresponding to the light source color estimated at step 404A is acquired.

At the next step 404C, white balancing is executed by the image processor 28 with the gain acquired at step 404B, and then the white balance processing is ended.

Returning to FIG. 14, at step 406, the processing target pixel (pixel of interest (i, j)) is set by the image processor 28 from the split-image generated at step 402. In such cases, for example, in cases in which the size of the split-image is m×n pixels, the pixel of interest is transitioned sequentially each time step 406 is performed, from pixel (1, 1) to pixel (m, n).

Then at step 408, determination is made as to whether or not the normal image obtained by the image processor 28 executing the white balance processing at step 404 is a non-achromatic image. Reference here to "achromatic image" indicates, for example, an image in which the R, G, B configuration ratio satisfies |R−0.33|≤0.05 and |G−0.33|≤0.05, and |B−0.33|≤0.05. Affirmative determination is made at step 408 in cases in which the normal image is a non-achromatic image, and processing proceeds to step 410. Negative determination is made at step 408 in cases in which the normal image is an achromatic image, and processing proceeds to step 412.

Determination as to whether or not the normal image is an achromatic image may be performed by determining whether or not the occupied ratio of an achromatic region (number of pixels of the achromatic pixels) in the total region of the normal image (total number of pixels) is a predetermined occupied ratio (for example 95%) or greater. Moreover, in cases in which a specific region in the normal image is an achromatic region, determination may be that the normal image is an achromatic image. Moreover, in cases in which an achromatic region at a region of the normal image adjacent to the boundary with the split-image is a predetermined surface area (specific surface area) or greater, determination may be that the normal image is an achromatic image. Moreover, in cases in which, even though a region of the normal image adjacent to the boundary with the split-image is not achromatic, the achromatic region occupied ratio is however a predetermined occupied ratio or greater due to other regions being achromatic regions, determination may be that the normal image is a non-achromatic image.

Figure 16:
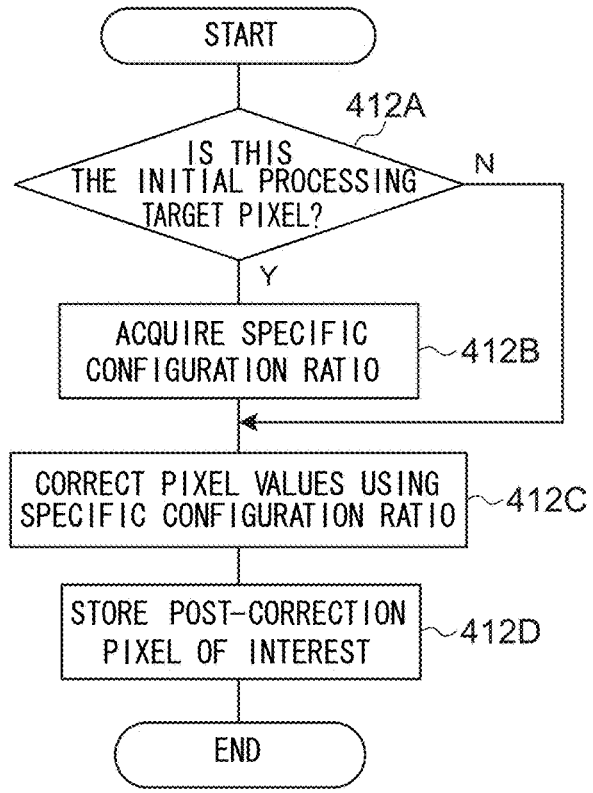
FIG. 16 is a flowchart illustrating an example of a flow of chromatic color application processing performed by an image processor included in an imaging device according to the first exemplary embodiment.

At step 412, chromatic color application processing is executed by the image processor 28. FIG. 16 illustrates an example of a flow of chromatic color application processing. At step 412A illustrated in FIG. 16, determination is made as to whether or not the pixel of interest set by the image processor 28 at step 406 is the initial processing target pixel. Affirmative determination is made at step 412A in cases in which the pixel of interest is the initial processing target pixel, and processing proceeds to step 412B. Negative determination is made at step 412A in cases in which the pixel of interest is not the initial processing target pixel, and processing proceeds to step 412C.

A predetermined R, G, B configuration ratio (referred to below as "specific configuration ratio") is stored in a specific storage region (for example the memory 26) that enables chromatic color application to be performed to the pixel of interest by using the predetermined R, G, B configuration ratio to multiply the R, G, B pixel values of the pixel of interest.

At step 412B, the specific configuration ratio is acquired by the image processor 28 from the specific storage region. Then at step 412C, the pixel values of each of the R, G, B colors of the pixel of interest are corrected by the image processor 28 using each of the color components of the specific configuration ratio acquired at step 412B to multiply the pixel values of the same color in the pixel of interest. For example, in a case in which "R:G:B=0.2:0.2:0.6" is acquired at step 412B as the specific configuration ratio, the image processor 28 uses each of the color components of "R:G:B=0.2:0.2:0.6" to multiply the pixel values of the same color in the pixel of interest. The pixel of interest is thereby corrected to a blue-tinted pixel. Moreover, for example, in a case in which "R:G:B=0.6:0.2:0.2" is acquired at step 412B as the specific configuration ratio, the image processor 28 uses each of the color components of "R:G:B=0.6:0.2:0.2" to multiply the pixel values of the same color in the pixel of interest. The pixel of interest is thereby corrected to a red-tinted pixel. Accordingly, due to execution of step 412C by the image processor 28, chromatic color with color characteristics different from the color characteristics of the normal image is determined as the display color for the pixel of interest.

At the next step 412D, an image is stored in the specific storage region (for example the memory 26) by the image processor 28 storing the R, G, B pixel values of the pixel of interest corrected at step 412C, then processing proceeds to step 418.

At step 410, determination is made by the image processor 28 as to whether a display color assimilation condition that is a condition to execute display color assimilation processing has not been satisfied. A condition of input of an instruction to start execution of display color assimilation processing through the operation section 14 is an example of reference here to "display color assimilation condition". Affirmative determination is made at step 410 in cases in which the display color assimilation condition has not been satisfied, and processing proceeds to step 414. Negative determination is made at step 410 and processing proceeds to step 416 in cases in which the display color assimilation condition has been satisfied.

An example is given here in which processing proceeds to step 414 in cases in which affirmative determination is made at step 410. However, a step to perform processing to determine whether or not a condition to execute display color differentiation processing has been satisfied may be inserted between step 410 and step 414. In such cases, affirmative determination is made in cases in which the condition to execute the display color differentiation processing has been satisfied, and processing proceeds to step 414, and negative determination is made in cases in which the condition to execute the display color differentiation processing has not been satisfied, and processing proceeds to step 418. A condition of input of an instruction to start execution of display color differentiation processing through the operation section 14 is an example of a condition to execute display color differentiation processing. Another example is a condition that the average value (or the configuration ratio) of the R, G, B pixel values of the normal image, and the average value (or configuration ratio) of the R, G, B pixel values of the split-image, match each other to within a predetermined tolerance for each of the R, G, B colors.

Figure 17:
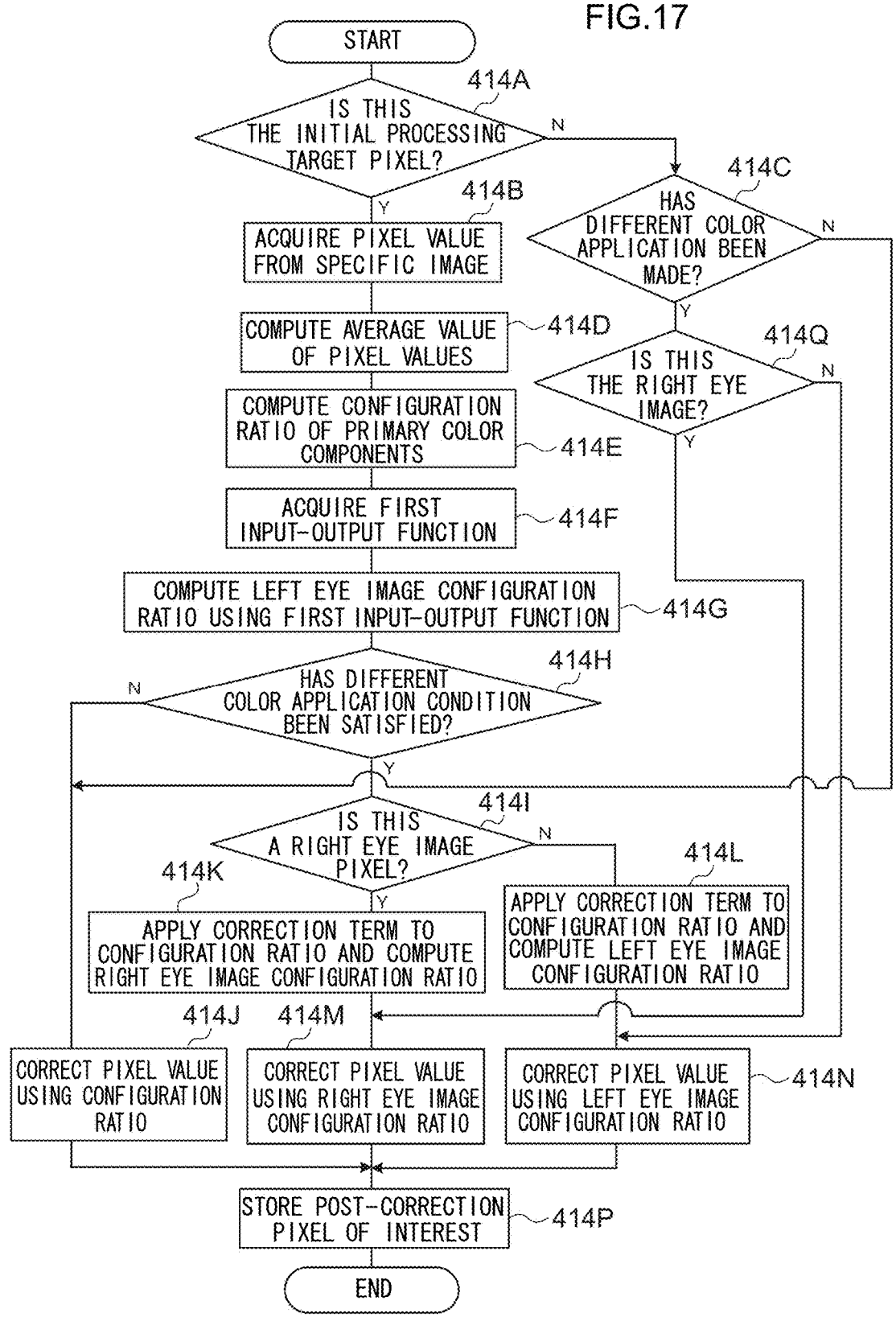
FIG. 17 is a flowchart illustrating an example of a flow of display color differentiation processing performed by an image processor included in an imaging device according to the first exemplary embodiment.

At step 414, the display color discrimination processing is executed by the image processor 28. FIG. 17 is an example of a flow of display color differentiation processing. At step 414A illustrated in FIG. 17, determination is made as to whether or not the pixel of interest set at step 406 is the initial processing target pixel. Affirmative determination is made at step 414A in cases in which the pixel of interest is the initial processing target pixel, and processing proceeds to step 414B. Negative determination is made at step 414A in cases in which the pixel of interest is not the initial processing target pixel, and processing proceeds to step 414C.

At step 414B, the R, G, B pixel values are acquired by the image processor 28 from a specific image (for example, the pixel values for all the pixels included in the specific image). Reference here to a "specific image" indicates employing a portion of the normal image generated at step 400, however, there is no limitation thereto, and as well as the normal image, the left eye image or the right eye image generated at step 402 may be employed. At step 414B, as "a portion of the normal image", an image output from an edge portion of a normal image capture region in the normal image generated at step 400 present on the side of the boundary with the split-image capture region is employed. Regarding the size of what is referred to here as the "edge portion", this indicates, for example, a size of ⅓ the width of the normal image region. "A size of ⅓ the width of the normal image region" is merely an example, and it should be a sufficient region to obtain valid pixel values (an example of color data), and obviously the size of the "edge portion" required to acquire valid pixel values is different depending on the size of the normal image region, the size of the split-image, and the like. There is also no limitation to the edge portion, and another region in the normal image may be employed. Another region in the normal image indicates a region in the normal image other than the "edge portion". Moreover, the "specific image" does not need to necessarily be a portion of the normal image, and may be an image of the whole region of the normal image. The "normal image capture region" is the region employed to capture a normal image with the image pick-up device 20, and indicates, for example, a region of the image pick-up device 20 corresponding to the "normal image display region" illustrated in FIG. 10. The above "split-image capture region" is a region in the image pick-up device 20 that is employed to capture the split-image and is adjacent to the normal image region, and indicates, for example, a region of the image pick-up device 20 corresponding to the "split-image display region" illustrated in FIG. 10.

At the next step 414D, the average values for each color of the R, G, B pixel values acquired at step 414B are computed by the image processor 28. At the next step 414E, a configuration ratio of the R, G, B pixel values is computed by the image processor 28 based on the average values for each color of the R, G, B pixel values computed at step 414D. The image processor 28 computes here, for example, the R, G, B configuration ratio by normalizing such that the sum of the average values for each color of the R, G, B pixel values computed at step 414D equals "1".

At the next step 414F, the first input-output function F(W) is acquired by the image processor 28 from a specific storage region. At the next step 414G, the configuration ratio of the R, G, B pixel values in the split-image is computed by the image processor 28 employing the first input-output function F(W). Namely, the R, G, B pixel value configuration ratio computed at step 414E is converted by the first input-output function F(W) into the R, G, B pixel values configuration ratio of the split-image.

At the next step 414H, determination is made by the image processor 28 as to whether or not a different color application condition is satisfied. What is referred to here as the "different color application condition" indicates a condition to execute processing to apply different chromatic color (different color application processing) to each of the image from the left eye image and the image from the right eye image in the split-image. A condition in which an instruction has been given through the operation section 14 to start executing different color application processing is as an example of the different color application condition. What is referred to here as "different color application processing" indicates, for example, steps 414I, 414K, 414L, 414M, 414N as described below. Affirmative determination is made at step 414H in cases in which the different color application condition has been satisfied, and processing proceeds to step 414I. Negative determination is made at step 414H in cases in which the different color application condition has not been satisfied, and processing proceeds to step 414J.

At step 414I, determination is made by the image processor 28 as to whether or not the pixel of interest set at step 406 is a pixel included in the right eye image. Negative determination is made at step 414I if the pixel of interest is a pixel not included in the right eye image (in cases in which the pixel of interest is a pixel included in the left eye image), and processing proceeds to step 414L. Affirmative determination is made at step 414I if the pixel of interest is a pixel included in the right eye image, and processing proceeds to step 414K.

At step 414K, a right eye image configuration ratio is computed by the image processor 28 by applying a right eye image correction term to the configuration ratio computed at step 414G. For example, if the R, G, B pixel value configuration ratio computed at step 414G is denoted F(Wr), F(Wg), F(Wb), then the R component of the right eye image configuration ratio is computed as "F(Wr)+ΔR" by adding a correction term ΔR to the F(Wr). The G component of the right eye image configuration ratio is computed as "F(Wg)+ΔG" by adding a correction term ΔG to the F(Wg). The B component of the right eye image configuration ratio is computed as "F(Wb)+ΔB" by adding a correction term ΔB to the F(Wb).

Next at step 414M, pixel values of each of the R, G, B colors of the pixel of interest are corrected by the image processor 28 multiplying pixel values of the same color of the pixel of interest by each color component of the right eye image configuration ratio computed at step 414K, and then processing proceeds to step 414P. By the image processor 28 thus executing step 414M, a color with different color characteristics to the color characteristics of normal pixels is determined as the display color of the pixel of interest.

At step 414L, a left eye image configuration ratio is computed by the image processor 28 by applying a left eye image correction term to the configuration ratio computed at step 414G. For example, if the R, G, B pixel value configuration ratio computed at step 414G is denoted F(Wr), F(Wg), F(Wb), then the R component of the left eye image configuration ratio is computed as "F(Wr)−ΔR" by subtracting a correction term ΔR from the F(Wr). The G component of the left eye image configuration ratio is computed as "F(Wg)−ΔG" by subtracting a correction term AG from the F(Wg). The B component of the left eye image configuration ratio is computed as "F(Wb)−ΔB" by subtracting a correction term ΔB from the F(Wb). The correction terms ΔR, ΔG, ΔB may be any values with a visible difference, and may, for example, employ simple linear multiple values on the F(Wr), F(Wg), F(Wb) such that ΔR=σF(Wr), ΔG=σF(Wg), ΔB=σF(Wb).

At the next step 414N, pixel values of each of the R, G, B colors of the pixel of interest are corrected by the image processor 28 multiplying pixel values of the same color of the pixel of interest by each color component of the left eye image configuration ratio computed at step 414L, and then processing proceeds to step 414P. By the image processor 28 thus executing step 414N, a color with different color characteristics to the color characteristics of normal pixels is determined as the display color of the pixel of interest. By the image processor 28 thus executing step 414N and step 414L, the display color is determined of a split-image with different chromaticity for the left eye image and the right eye image in the split-image.

At step 414J, pixel values of each of the R, G, B colors of the pixel of interest are corrected by the image processor 28 by multiplying pixel values of the same color of the pixel of interest by each color component of the configuration ratio computed at step 414G, and then processing proceeds to step 414P. By the image processor 28 thus executing step 414J, a color with different color characteristics to the color characteristics of normal pixels is determined as the display color of the pixel of interest.

At step 414P, an image is stored by the image processor 28 in a specific storage region (for example memory 26) by storing R, G, B pixel values of the pixel of interest corrected at step 414J, 414M, or 414N, and then processing proceeds to step 418.

At step 414C, determination is made as to whether or not different color application processing has been executed on the previous processing target pixels. Affirmative determination is made at step 414C if the different color application processing has been executed on the previous processing target pixels at step 414C, and processing proceeds to step 414Q. Negative determination is made at step 414C if the different color application processing has not been executed on the previous processing target pixels at step 414C, and processing proceeds to step 414J.

At step 414Q, determination is made by the image processor 28 as to whether or not the pixel of interest set at step 406 is a pixel included in the right eye image. Negative determination is made at step 414Q if the pixel of interest is not a pixel included in the right eye image (in cases in which the pixel of interest is a pixel included in the left eye image), and processing proceeds to step 414N. Affirmative determination is made at step 414Q if the pixel of interest is included in the right eye image, and processing proceeds to step 414M.

Figure 18:
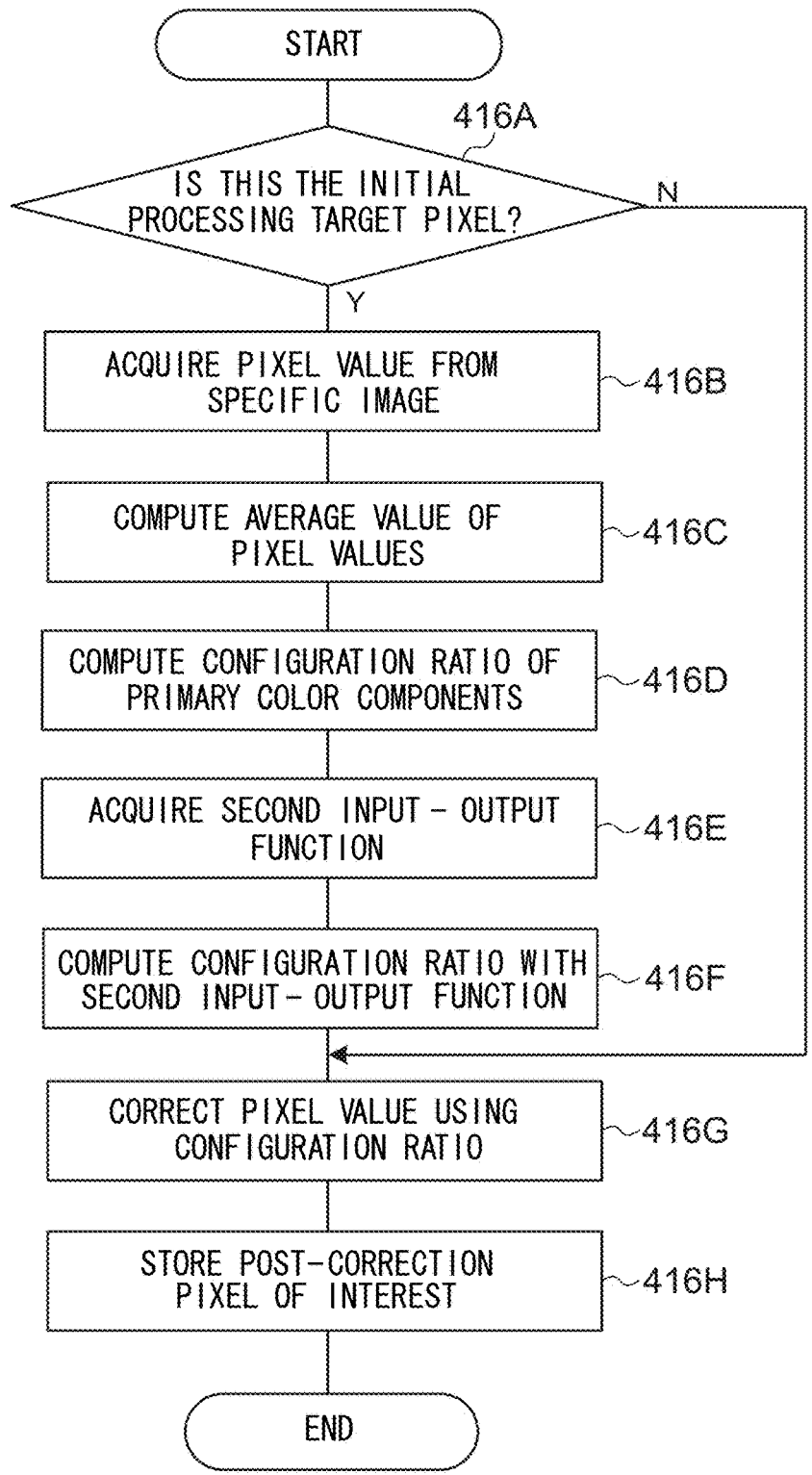
FIG. 18 is a flowchart illustrating an example of a flow of display color assimilation processing performed by an image processor included in an imaging device according to the first exemplary embodiment.

Returning to FIG. 14, at step 416 display color assimilation processing is executed by the image processor 28. FIG. 18 illustrates an example of flow of display color assimilation processing. At step 416A illustrated in FIG. 18, determination is made as to whether or not the pixel of interest set at step 406 is the initial processing target pixel. Affirmative determination is made at step 416A if the pixel of interest is the initial processing target pixel, and processing proceeds to step 416B. Negative determination is made at step 416A if the pixel of interest is not the initial processing target pixel, and processing proceeds to step 416G.

At the next step 416B, the R, G, B pixel values from a specific image (for example pixel values for all the pixels included in a specific image) are acquired by the image processor 28. The "specific image" referred to here indicates, for example, an image corresponding to a "specific image" employed at step 414B.

At the next step 416C, the average value for each of the colors of the R, G, B pixel values acquired at step 416B are computed by the image processor 28. At the next step 416D, the configuration ratio of the R, G, B pixel values is computed by the image processor 28 based on the average pixel value for each color of the R, G, B pixel values computed at step 416C. Here the image processor 28, for example, computes the R, G, B configuration ratio by normalizing such that the sum of the average value of each of the colors of the R, G, B pixel values computed at step 416C becomes "1".

At the next step 416E, a second input-output function G(W) is acquired by the image processor 28 from a specific storage region. At the next step 416F, the second input-output function G(W) is employed by the image processor 28 to compute the configuration ratio of the R, G, B pixel values in the split-image. Namely, the configuration ratio of the R, G, B pixel values computed at step 416D is converted by the second input-output function G(W) into the R, G, B pixel value configuration ratio of the split-image.

At the next step 416G, each of the R, G, B pixel values of the pixel of interest are corrected by the image processor 28 by multiplying the pixel values of the same color in the pixel of interest by each of the color components of the configuration ratio computed at step 416F, and then processing proceeds to 416H. By the image processor 28 thus executing step 416G, a color with color characteristics a predetermined degree near to the color characteristics of a normal image is determined as the display color of the pixel of interest.

At the next step 416H, an image is stored by the image processor 28 storing the R, G, B pixel values of the pixel of interest corrected at step 416G in a specific storage region (for example the memory 26), then processing proceeds to step 418.

Returning to FIG. 14, at step 418, image processing other than WB processing, chromatic color application processing, display color differentiation processing, and display color matching processing (for example gamma correction, synchronization processing, and the like) is performed on the pixel of interest (i, j) set at step 406.

At the next step 420, an image is stored by the image processor 28 storing pixel values obtained for each pixel by the image processing performed at step 418 in a specific storage region (for example the memory 26), and then processing proceeds to step 422.

At the next step 422, determination is made by the image processor 28 as to whether or not the chromatic color application processing, the display color differentiation processing, or the display color assimilation processing has been completed for all the pixels. Affirmative determination is made at step 422 if the chromatic color application processing, the display color differentiation processing, or the display color assimilation processing has been completed for all the pixels, and processing proceeds to 424. Negative determination is made at step 422 if the chromatic color application processing, the display color differentiation processing, or the display color assimilation processing has not been completed for all the pixels, and processing proceeds to step 406.

At step 424, after the image stored in the specific storage region at steps 400, 420 has been output by the image processor 28 to a specific output destination, the present image processing is ended. As the "specific output destination", an example is the display controller 36, and, in cases in which output to an external device is instructed by a photographer or the like through the operation section 14, the "specific output destination" may be the external I/F 39.

When the image stored in the specific storage region at steps 400, 420 has been output to the display controller 36, as an example, a live-view image is displayed on the display device as illustrated in FIG. 19, FIG. 20, FIG. 22 and FIG. 23. Live-view images include normal images and split-images. The split-images are split into right eye images and left eye images (see, for example, FIG. 20).

In cases in which an imaging subject is not in focus in the imaging lenses 16, misalignment occurs in the parallax generation direction (for example the horizontal direction) between the left eye image and the right eye image of the split-image. There is also misalignment in the parallax generation direction at the image of the boundary between the normal image and the split-image. This shows that phase difference is occurring, and a photographer is able to visually discern that phase difference has occurred, and able to visually discern the parallax generation direction, using the split-image.

However, in cases in which the imaging subject is in focus in the imaging lenses 16, there is no misalignment between the left eye image and the right eye image in the split-image. There is also no misalignment in the image of the boundary between the normal image and the split-image. This shows that phase difference has not occurred, and a photographer is able to visually discern that phase difference has not occurred, using the split-image.

Thus the photographer is able to check the state of focus of the imaging lenses 16 using the split-image displayed on the display device. Moreover, in manual focus mode, the focus misalignment amount (defocus amount) can be made zero by manual operation of a focus ring 302 of the imaging lenses 16. Moreover, a color image can be displayed that does not have a mismatch in color between the normal image and split-image, enabling manual focusing adjustment by a photographer to be assisted by using a color split-image.

Figure 19:
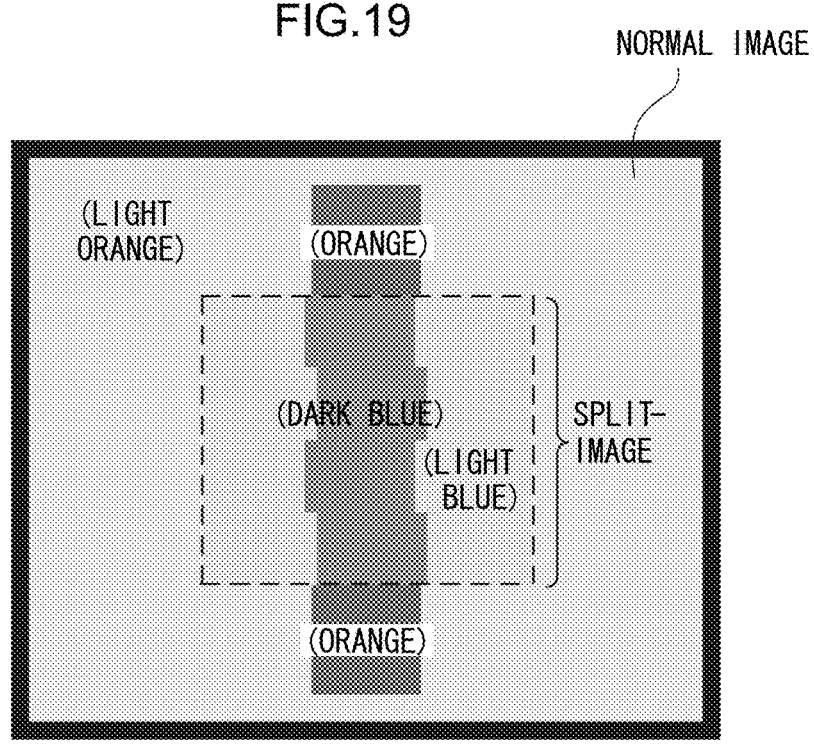
FIG. 19 is a screen shot diagram illustrating an example of a normal image and a split-image, in a live-view image displayed on a display device of an imaging device of the first exemplary embodiment, when display color differentiation processing has been executed.

In the display color assimilation processing illustrated in FIG. 17, when the processing of step 414J is executed by the image processor 28, as illustrated for example in FIG. 19, a normal image is displayed on the display device together with a split-image with a color having different color characteristics to the color characteristics of the normal image. In the example illustrated in FIG. 19, the display color of the normal image has a reddish color (in this example orangey), and the display color of the split-image is a bluish color. In such a case, for example, the configuration ratio of the R, G, B pixel values of the normal image may be "R:G:B=0.35: 0.35:0.3", and the configuration ratio of the R, G, B pixel values of the split-image may be "R:G:B=0.31:0.31:0.38". Thus, in cases in which the color ratio of the overall scene (for example the normal image) has a strong influence from a reddish object color, a bluish color is employed as the display color of the split-image. In contrast thereto, in cases in which the color ratio of the overall scene has a strong influence from a bluish object color, a reddish color is employed as the display color of the split-image. This thereby enables the split-image to be made to stand out from the normal image.

Figure 20:
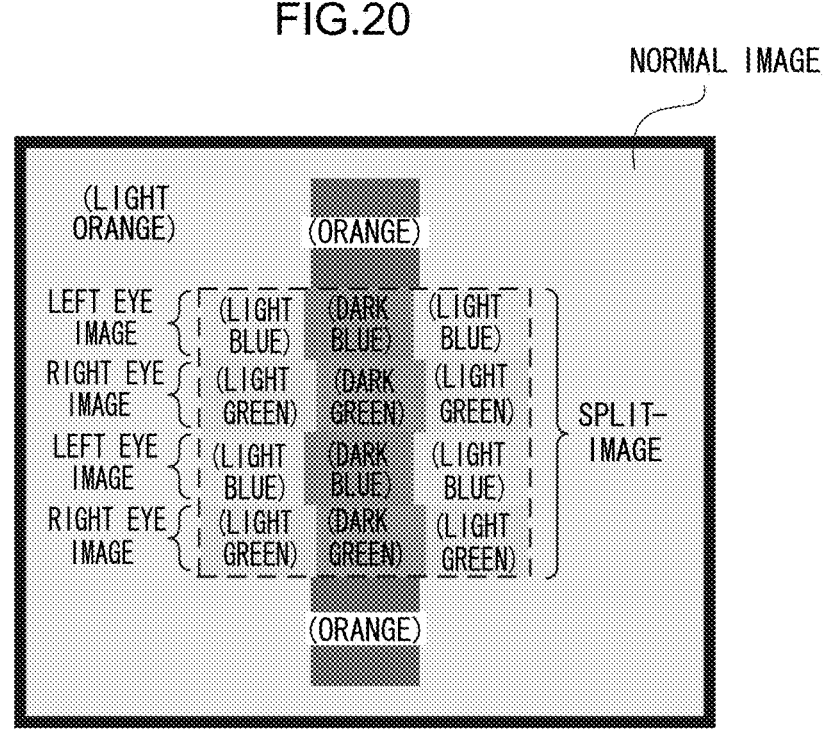
FIG. 20 is a screen shot diagram illustrating an example of a normal image and a color separated split-image, in a live-view image displayed on a display device of an imaging device of the first exemplary embodiment, when display color differentiation processing has been executed.

In the display color differentiation processing illustrated in FIG. 17, on execution of the processing of steps 414K, 414L, 414M, 414N by the image processor 28, a split-image is displayed with different color characteristics for the left eye image and the right eye image, as illustrated for example in FIG. 20. In the example illustrated in FIG. 20, the left eye image of the split-image is a bluish color, and the right eye image of the split-image is a greenish color. The display color of the normal image is a reddish color (in this example orangey), similar to the example illustrated in FIG. 19. This thereby enables the split-image to be made to stand out from the normal image, and also for the left eye image and the right eye image to be easily discriminable in the split-image.

Figure 21:
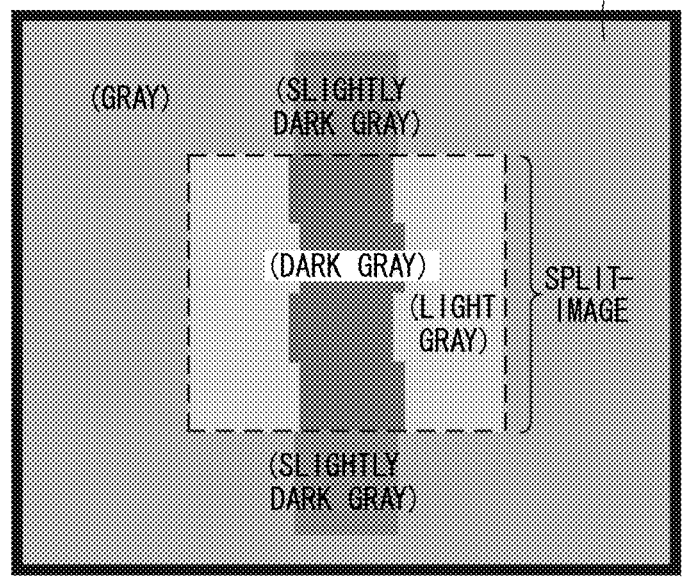
FIG. 21 is a screen shot diagram illustrating an example of an achromatic normal image and an achromatic split-image in a live-view image displayed on a display device of an imaging device of the first exemplary embodiment.
Figure 22:
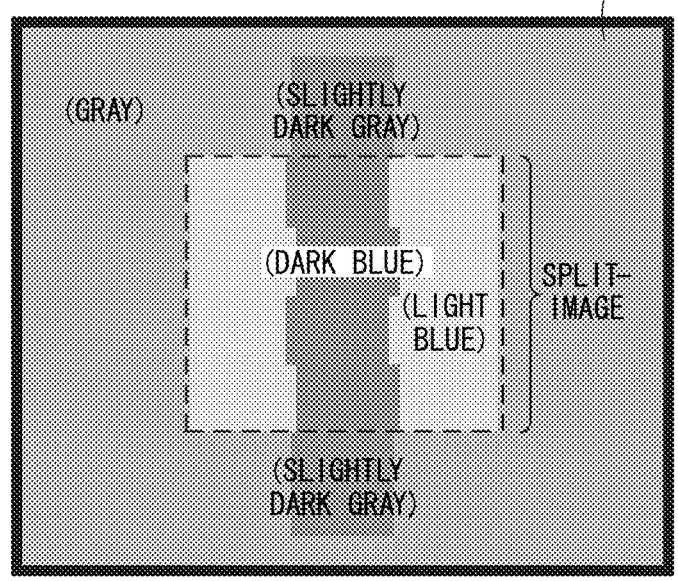
FIG. 22 is a screen shot diagram illustrating an example of an achromatic normal image and a chromatic split-image in a live-view image displayed on a display device of an imaging device of the first exemplary embodiment.

In cases in which the normal image is an achromatic image (step 408: N), then since the split-image is also an achromatic image, it becomes difficult to make a visual check on the boundary between the normal image and the split-image, as in the example illustrated in FIG. 21. The image processor 28 according to the first exemplary embodiment accordingly applies chromatic color to the split-image, such as in the example illustrated in FIG. 22, by executing chromatic color application processing illustrated in FIG. 16. In the example illustrated in FIG. 22 a bluish color is applied as the display color of the split-image. This thereby enables the split-image to be made to stand out from the achromatic normal image. Configuration may be made such that the light source color is estimated by the image processor 28, and a bluish color is employed as the display color of the split-image in cases in which the estimated light source color is dominated by a reddish color, and a reddish color is employed as the display color of the split-image in cases in which the estimated light source color is dominated by a bluish color.

Figure 23:
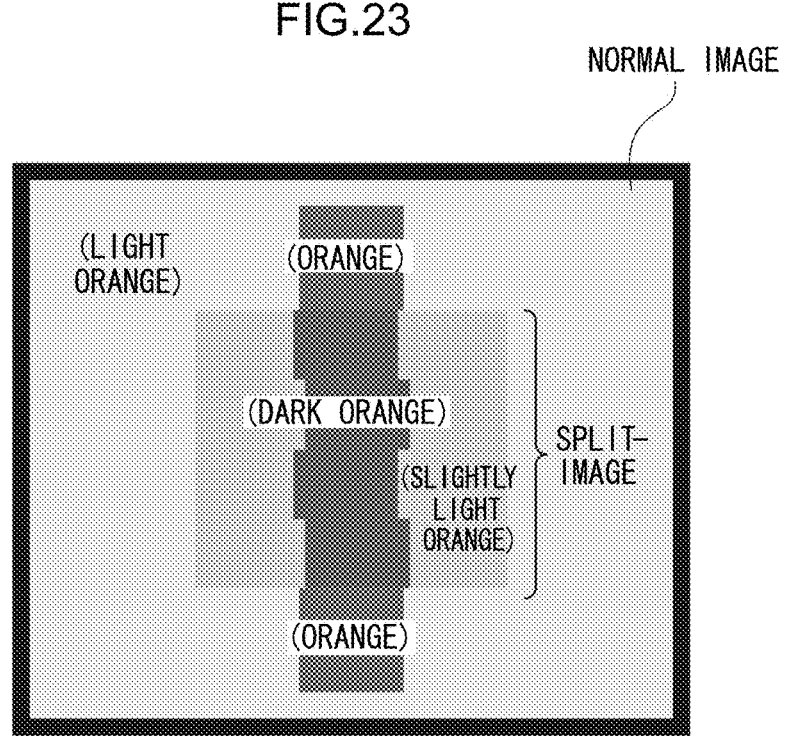
FIG. 23 is a screen shot diagram illustrating an example of a normal image and a split-image with similar color characteristics in a live-view image displayed on a display device of an imaging device of the first exemplary embodiment.

When the display color assimilating processing illustrated in FIG. 18 is executed by the image processor 28, for example as illustrated in FIG. 23, the normal image and the split-image are displayed with their display colors assimilating each other. In the example illustrated in FIG. 23, since the object color of the normal image is dominated by reddishness (for example orangey), a reddish color is employed as the display color of the split-image, thereby displaying the split-image so as to blend in with the normal image. This thereby enables the boundary between the normal image and the split-image to be made difficult to visually discern.

As explained above, in the imaging device 100 according to the first exemplary embodiment, light rays passing through the exit pupil of the imaging lenses 16 on the left side and the right side of the optical axis (an example of a subject-image passing through first and second regions) are pupil-divided and respectively focused to include first and second pixel groups. The image processor 28 serving as an example of a normal image generation section generates a normal image that is an example of a first display image based on an image output from the image pick-up device 20 including the first and second pixel groups (step 400). The image processor 28 serving as an example of a second display image generation section generates a split-image that is an example of a second display image based on the first and second images output from the first and second pixel groups (step 402). The image processor 28 serving as an example of an acquisition section acquires color data of the generated normal image (step 414B). The image processor 28 serving as an example of a determination section, based on the acquired color data, determines a color with different color characteristics to the color characteristics of the normal image as the display color of the split-image (steps 414J, 414M, 414N). This thereby enables the visibility of the boundary line between the normal image and the split-image to be improved compared to cases not adopting the present configuration.

The imaging device 100 according to the first exemplary embodiment employs, as a color with different color characteristics to the color characteristics of the normal image, a color with color characteristics visibly different from the color characteristics of the normal image. The normal image and the split-image are accordingly visually more discriminable than cases not adopting the present configuration.

In the imaging device 100 according to the first exemplary embodiment, the image processor 28 acquires color data from the normal image. This thereby enables the color characteristics of the split-image and the color characteristics of the normal image to be made different from each other using a simple configuration with higher precision than cases not adopting the present configuration.

In the imaging device 100 according to the first exemplary embodiment, the image processor 28 acquires the color data based on the normal image and the split-image. This thereby enables the color characteristics of the split-image and the color characteristics of the normal image to be made different from each other with higher precision than cases not adopting the present configuration. Moreover, the color data can still be acquired even if the normal image has whiteout due to the low sensitivity of the first and second pixel groups. The color data may be acquired based on the normal image and the first image, the color data may be acquired based on the normal image and the second image, and the color data may be acquired based on the normal image, the first image, and the second image.

In the imaging device 100 according to the first exemplary embodiment, the image pick-up device 20 includes a normal image capture region employed for capturing the normal image, and a split-image capture region that is adjacent to the normal image capture region and is employed for capturing the split-image. The image processor 28 acquires the color data in the normal image from an image output from an edge portion in the normal image capture region on the side of the boundary with the split-image capture region.

This thereby enables the boundary between the normal image and the split-image to be made clearer than in cases not adopting the present configuration.

The imaging device 100 according to the first exemplary embodiment employs the color data representing the color characteristics of the object color of the normal image as the color data. This thereby enables visibility of the boundary line between the normal image and the split-image to be improved more than in cases not adopting the present configuration, even in cases in which the object color dominates the normal image to a greater extent than the light source color.

The imaging device 100 according to the first exemplary embodiment employs color characteristics different from the object color of the normal image as the color characteristics different from the color characteristics of the normal image. This thereby enables visibility of the boundary line between the normal image and the split-image to be improved more than in cases not adopting the present configuration, even in cases in which the object color dominates the normal image to a greater extent than the light source color.

The imaging device 100 according to the first exemplary embodiment employs hue as the color characteristics. This thereby enables, using a simple configuration, the boundary line between the normal image and the split-image to be made even more visible than in cases not adopting the present configuration.

In the imaging device 100 according to the first exemplary embodiment, as a color with different color characteristics to the color characteristics of the normal image, a color a predetermined angle in a color circle away from the object color of the normal image is employed. This thereby enables easy determination of an appropriate object color as the color with different color characteristics to the color characteristics of the normal image compared to cases not adopting the present configuration.

In the imaging device 100 according to the first exemplary embodiment, as the above predetermined angle, an angle is employed to obtain a color with visibly different color characteristics to the color characteristics of the object color of a normal image. This thereby enables the split-image to be made to stand out more clearly from the normal image than in cases not adopting the present configuration.

In the imaging device 100 according to the first exemplary embodiment, the configuration ratio of the primary color components in the normal image is employed as the color characteristics of the object color in the normal image. This thereby enables not only the visibility of the boundary line between the normal image and the split-image to be improved, but also for appropriate color characteristics to be determined more easily as the color characteristics of the object color of the normal image, compared to cases not adopting the present configuration.

In the imaging device 100 according to the first exemplary embodiment, the configuration ratio of the primary color component in the normal image after executing white balancing is employed as the configuration ratio of the primary color component in the normal image. This thereby enables a clearer boundary line to be achieved between the normal image that has been subjected to white balancing and the split-image, than in cases not adopting the present configuration.

In the imaging device 100 according to the first exemplary embodiment, the image processor 28 serving as an example of an estimation section estimates the light source color based on the normal image. Gain for the primary color component employed in white balancing is then determined according to the light source color estimated by the image processor 28. This thereby enables the visibility of the boundary line between the normal image subjected to white balancing and the split-image to be improved in consideration of the light source color more than in cases not adopting the present configuration.

In the imaging device 100 according to the first exemplary embodiment, the configuration ratio of the primary color component in the normal image is determined based on the average values of the pixel values for each of the primary color components of the object color in the normal image. This thereby enables not only the visibility of the boundary line between the normal image and the split-image to be improved, but also an appropriate configuration ratio to be obtained easily as the configuration ratio of the primary color component for the normal image, compared to cases not adopting the present configuration.

In the imaging device 100 according to the first exemplary embodiment, the configuration ratio of the primary color component in the normal image is converted by an input-output function including a declining function, and the obtained configuration ratio after conversion is employed as the color characteristics different from the color characteristics of the normal image. This thereby enables the visibility of the boundary line between the normal image and the split-image to be improved using a simple configuration more than in cases not adopting the present configuration.

In the imaging device 100 according to the first exemplary embodiment, each of the first and second pixel groups is a single color pixel group, and the image processor 28 generates an achromatic image as the split-image based on the first and second images output from the first and second pixel groups. This thereby enables an achromatic split-image to be obtained with a simpler configuration than cases not adopting the present configuration.

In the imaging device 100 according to the first exemplary embodiment, a green pixel group is employed as the single color pixel group referred to above. This thereby enables achromatic images to be obtained as the achromatic split-image at higher precision than in cases not adopting the present configuration.

In the imaging device 100 according to the first exemplary embodiment, in cases in which the split-image is an achromatic image, a chromatic color with color characteristics different from the color characteristics of the normal image is determined by the image processor 28 as the display color of the split-image, based on the acquired color data. This thereby enables a chromatic color to be determined as the display color of the split-image using a simpler configuration than in cases not adopting the present configuration.

In the imaging device 100 according to the first exemplary embodiment, in cases in which the normal image and the split-image are achromatic images, the image processor 28 determines a chromatic color with color characteristics different from the color characteristics of the normal image as the display color for the split-image based on the acquired color data. This thereby enables the visibility of the boundary line between the normal image and the split-image to be improved compared to cases not adopting the present configuration.

In the imaging device 100 according to the first exemplary embodiment, the image processor 28 determines chromatic color with color characteristics different from the color characteristics of the normal image that is also chromatic color with different colors for the left eye image and the right eye image in the split-image as the display colors of the split-image. This thereby enables the left eye image and the right eye image to be visually discriminated more easily than in cases not adopting the present configuration.

In the imaging device 100 according to the first exemplary embodiment, an image is employed as the split-image that has the left eye image and the right eye image disposed alternately to each other in a direction (an example of a predetermined direction) intersecting with the parallax generation direction. This thereby enables the left eye image and the right eye image in the split-image to be made even more easily visually discriminated.

In the imaging device 100 according to the first exemplary embodiment, in cases in which a display color assimilation condition is satisfied, based on the acquired color data, the image processor 28 further determines a color having color characteristics a predetermined degree near to the color characteristics of a normal image as the display color of the split-image. This thereby enables the boundary line between the normal image and the split-image to be made more difficult to visually discern than cases not adopting the present configuration.

In the imaging device 100 according to the first exemplary embodiment, the display controller 36 is further included that performs control of the display device to display in the same screen the normal image together with the split-image with display color corrected by the image processor 28. This thereby enables the boundary line between the normal image and the split-image to be made visible with a simple configuration than cases not adopting the present configuration.

In the imaging device 100 according to the first exemplary embodiment, the image pick-up device 20 includes a third pixel group, and the image processor 28 generates a normal image based on the third image output from the third pixel group. This thereby enables the quality of the normal image to be improved compared to cases not adopting the present configuration.

In the first exemplary embodiment described above, the configuration ratio of the primary color component in the normal image after executing WB is employed, however there is no limitation thereto, and the configuration ratio of the primary color component in the normal image prior to executing WB may be employed, and the configuration ratio of the primary color component in the normal image after gamma correction may be employed.

In the first exemplary embodiment described above, explanation has been given of an example of a mode in which R, G, B pixel values of the object color in the normal image are employed as pixel values in an example of color data acquired from the normal image, however there is no limitation thereto, and R, G, B pixel values of light source color may be employed. This thereby enables the visibility of the boundary line between the normal image and the split-image to be improved even in cases in which the light source color dominates more than the object color in the normal image.

Moreover, in the first exemplary embodiment, explanation has been given of an example in which pixel values are corrected in chromatic color application processing and display color discrimination processing by a configuration ratio that does not depend on the type of display device, however pixel values may be corrected with a configuration ratio determined according to the type of display device. For example, in cases in which use of the EVF 248 is detected by the eyepiece detection section 37, a configuration ratio obtained by applying a further correction term (for example a plus correction term) to the configuration ratio employed for correction of pixel values as explained in the first exemplary embodiment described above is employed to perform correction of pixel values. This thereby enables the boundary line between the normal image and the split-image to be visually discernable even in cases in which the EVF 248 is employed with a smaller display surface area than that of the display section 213.

In the first exemplary embodiment described above, the maximum output value of the first input-output function F(W) is "1", however it may be a value exceeding "1". In cases in which the output value of the first input-output function F(W) exceeds "1", normalization processing may subsequently be performed to correct to a value of "1" or less. Similar also applies to the output value of second input-output function G(W).

In the first exemplary embodiment described above, explanation has been given of an example in which a configuration ratio of R, G, B pixel values is computed from average values of R, G, B pixel values obtained from the specific image, however the configuration ratio of R, G, B pixel values may be computed from a representative value of R, G, B pixel values acquired from a specific image. Examples that can be given of the representative value referred to here include the modal value or median of R, G, B pixel values acquired from the specific image.

In the first exemplary embodiment described above, an example has been given of G pixels as the phase difference pixels, however there is no limitation thereto, and any of the R, G, B pixels may be employed therefor. In the first exemplary embodiment described above, an example has been given in which single color pixels are employed as the phase difference pixels, however there is no limitation thereto, and two or more types of pixel out of the R, G, B pixels may be employed as the phase difference pixels. In such cases, the color images are displayed as the split-image, and the present invention is also achieved in such cases. Note that the time taken for pixel value correction processing is shorter when single color phase difference pixels are employed as in the first exemplary embodiment described above compared to in cases in which plural colors of phase difference pixels are employed, and visual discrimination from the background color (for example the display color of the normal image) is also easier.

In the first exemplary embodiment described above, an example is given of an interchangeable lens digital camera without a reflex mirror, however there is no limitation thereto, and the present invention may be applied to an image capture device with integral lens.

In the first exemplary embodiment described above, an example is given of the imaging device 100 including the display section 213 and the EVF 248, however there is no limitation thereto, and either the display section 213 or the EVF 248 may be included.

In the first exemplary embodiment, an example has been given of a split-image multiply divided in the up-down direction, however there is no limitation thereto, and application may be made of an image multiply divided in the left-right direction or a diagonal direction as a split-image.

In the first exemplary embodiment described above, explanation has been given of an example of a mode in which a split-image is displayed, however there is no limitation thereto, and another focus-check image may be generated from a left eye image and a right eye image, and the focus-check image displayed. For example, the left eye image and the right eye image may be superimposed in a combined display, so as to display as a double image when not in focus and display as a clear image when in a focused state.

In the first exemplary embodiment described above, explanation has been given of an example in which the display color for output is determined according to the input-output function F(W) illustrated in FIG. 12, however there is no limitation thereto, and the display color for output may be determined using a color conversion table pre-stored in a specific storage region (for example the memory 26). In such cases, a color conversion table that reduces the output value as the input value increases may be given as an example of the color conversion table. Data relating to the input and output of the color conversion table may be data generated based on the input-output function F(W) illustrated in FIG. 12, or may be data generated based on a color circle. This thereby enables the visibility of the boundary line between the normal image and the split-image to be improved with a simple configuration. Similar applies to determining the display color for output according to the second input-output function G(W) illustrated in FIG. 13.

The flow of the image output processing (see FIG. 14), the flow of the white balance processing (see FIG. 15), the flow of chromatic color application processing (see FIG. 16), the flow of display color differentiation processing (see FIG. 17), and the flow of display color assimilation processing (see FIG. 18) explained in the first exemplary embodiment are merely examples thereof. Accordingly, it goes without saying that steps not required may be eliminated, new steps may be added, and the processing sequence may be rearranged within a range not departing from the spirit. Each type of the processing included in the image output processing may be realized by a software configuration utilizing a computer by implementing a program, or may be realized by a hardware configuration. Implementation may also be made with a combination of a hardware configuration and a software configuration. Similar applies to the white balance processing, the chromatic color application processing, the display color differentiation processing, and the display color assimilation processing.

Note that in the image output processing, in cases in which implementation is by executing a program with a computer, the program may be pre-stored in a specific storage region (for example the memory 26). Similar applies to the white balance processing, the chromatic color application processing, the display color differentiation processing, and the display color assimilation processing. Initial storage in the memory 26 is not always necessary. For example, a program may first be stored on a freely selectable "portable storage medium" such as a flexible disk, called a FD, a CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the internet, a Local Area Network (LAN), or the like, such that the computer acquires and executes such programs therefrom.

Second Exemplary Embodiment

In the first exemplary embodiment, an example is given of the imaging device 100, however modified examples of the imaging device 100 include mobile terminal devices such as, for example, mobile phones and smartphones including a camera function, personal digital assistants (PDAs), mobile gaming machines or the like. Detailed explanation follows regarding an example of a smartphone, with reference to the drawings.

Figure 24:
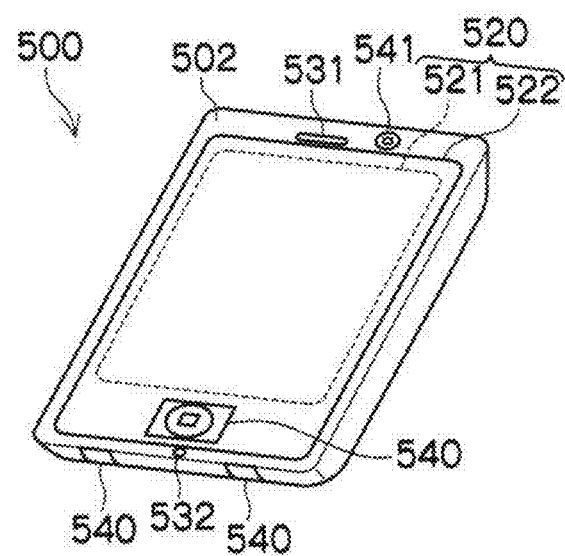
FIG. 24 is a perspective view illustrating an example of the external appearance of a smartphone according to a second exemplary embodiment.

FIG. 24 is a perspective view illustrating an example of the external appearance of a smartphone 500. The smartphone 500 illustrated in FIG. 24 includes a flat plate shaped casing 502, and a display and input section 520 provided on one face of the casing 502 and integrating together a display panel 521 serving as a display section and an operating panel 522 serving as an input section. The casing 502 includes a speaker 531, a microphone 532, an operating section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 25:
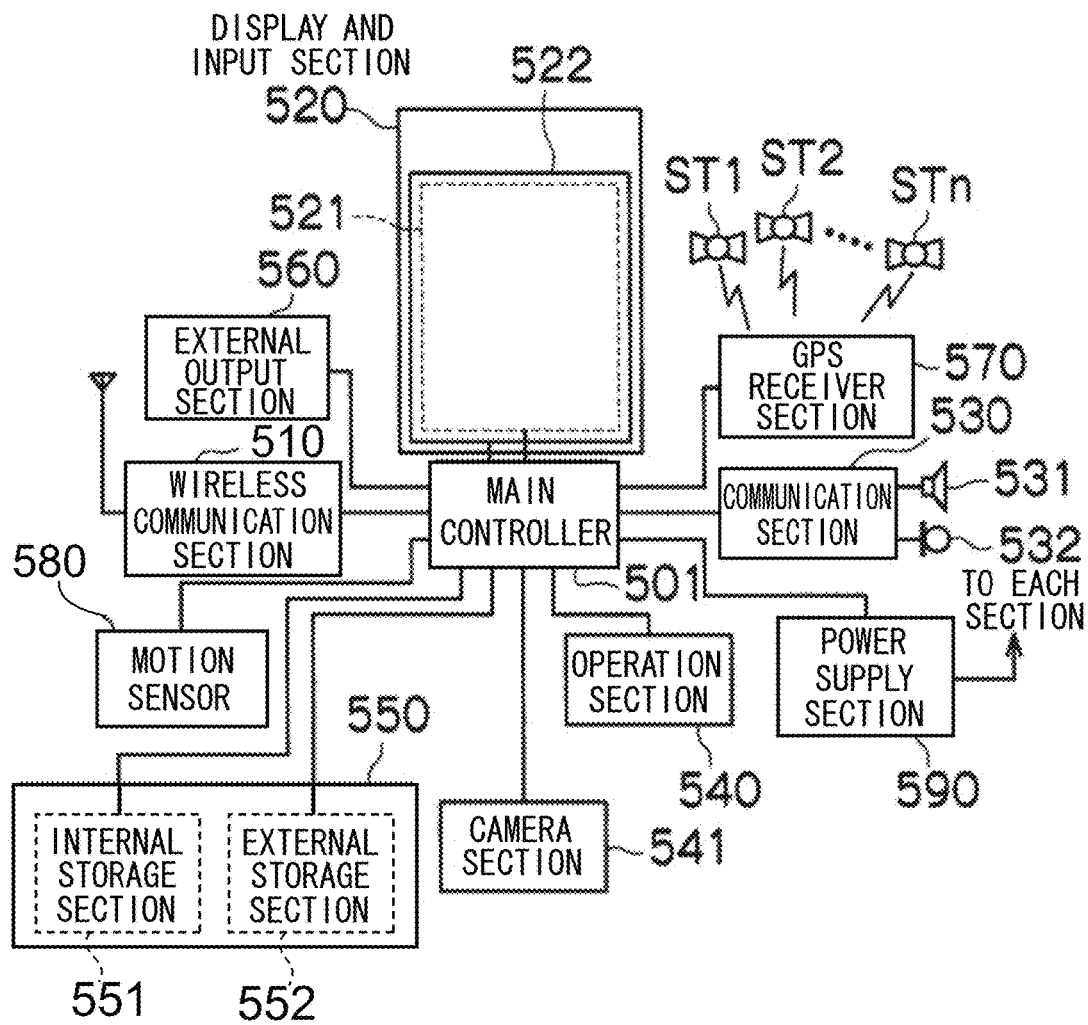
FIG. 25 is a block diagram illustrating an example of relevant configuration of an electrical system of a smartphone according to the second exemplary embodiment.

FIG. 25 is a block diagram illustrating an example of a configuration of the smartphone 500 illustrated in FIG. 24. As illustrated in FIG. 25, main configuration elements of the smartphone 500 include a wireless communication section 510, the display and input section 520, a communication section 530, an operation section 540, a camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation on the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 24, the display panel 521 and the operating panel 522 of the smartphone 500 are integrated together to configure the display and input section 520, and the operating panel 522 is disposed so as to entirely cover the display panel 521. In cases in which such a placement is adopted, the operating panel 522 may include a function to detect user operation even in a region outside of the display panel 521. In other words, the operating panel 522 may include a detection region for a superimposed section superimposed on the display panel 521 (referred to below as the display region), and a detection region for outer edge section other than the above that are not superimposed on the display panel 521 (referred to below as the non-display region).

The size of the display region and the size of the display panel 521 may completely match each other, however they do not necessarily have to match each other. The operating panel 522 may include two sensitive regions, at an outer edge portion and at an inside portion other than the outer edge portion. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The communication section 530 includes the speaker 531 and the microphone 532. The communication section 530 converts user voice input through the microphone 532 into voice data capable of being processed by the main controller 501, then outputs this to the main controller 501. The communication section 530 decodes voice data received by the wireless communication section 510 or by the external input-output section 560, and outputs the voice data from the speaker 531. As illustrated in FIG. 24, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 24, the operation section 540 is installed to a side face of the casing 502 of the smartphone 500, and is a push-button type of switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD® memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include, for example, a universal serial bus (USB), IEEE1394, or the like. Examples of networks include, for example, the internet, wireless LAN, BLUETOOTH®, radio frequency identification (RFID), and infrared data association (IrDA®) communication. Other examples of networks include ULTRA WIDEBAND (UWB®), and ZIGBEE®.

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, a wired/wirelessly connected personal computer, or earphones or the like may also be applied.

The external input-output section is capable of transmitting received data that was transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 and the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (not illustrated in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540, and the operating panel 522.

By executing display control the main controller 501 displays icons to startup application software, and software keys such as scroll bars, or displays windows to generate emails. Scroll bars are software keys to receive instructions to move the display portion of an image such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). It also includes a touch panel control function to receive the determination result, and to control the display position of the sensitive region of the operating panel 522 and the display position of the software key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, and combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 and the like.

The camera section 541 is capable of switching between a manual focus mode and an automatic focus mode. When the manual focus mode has been selected, focusing of the imaging lens of the camera section 541 can be performed by operating a focus icon button or the like displayed on the operation section 540 or the display and input section 520. Then during manual focus mode, a live-view image combined with a split-image is displayed on the display panel 521, thereby enabling the focus state to be checked during manual focus. The HYBRID FINDER 220 illustrated in FIG. 9 may be provided to the smartphone 500.

The camera section 541, under control of the main controller 501, converts image data obtained by photography into, for example, compressed image data such as in joint photographic coding experts group (JPEG). Then the image data obtained by conversion can be stored in the storage section 550, and output through the external input-output section 560 and the wireless communication section 510. In the smartphone 500 illustrated in FIG. 24, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 with image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operating panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the external input-output section 560 and the wireless communication section 510. Reference here to "various data" is, for example, to positional data acquired by the GPS receiver section 570 added to image data of still images or video images, and voice data acquired by the microphone 532 (which may be text data converted by speech to text conversion performed by the main controller or the like). It may moreover be orientation data acquired by the motion sensor 580.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the exemplary embodiments described above, examples have been explained in which the split-image is displayed within a display region of the normal image, however the present invention is not limited thereto, and the split-image (second display image) may be displayed on the display device without displaying the normal image (an example of the first display image). The split-image may also be displayed using the entire screen. An example that may be given of the "split-image" is cases in which an image pick-up device is employed configured from a phase difference pixels group alone (for example the first pixel group and the second pixel group), cases in which an image pick-up device is employed with phase difference pixels (for example the first pixel group and the second pixel group) placed at a specific proportion with respect to the normal pixels, and cases in which a split-image is based on images output from the phase difference pixel groups (for example the first image output from the first pixel group and the second image output from the second pixel group). Thus in the present invention, there is no limitation to a display mode that displays both the normal image and the split-image at the same time on the same screen of the display device, and the display controller 36 may perform control so as to control display of the split-image without displaying the normal image on the display device in cases in which an instruction to display the normal image is removed in a state in which display of the split-image is being instructed.

What is claimed is:

1. An image processing device, comprising:
a first display image generation section that generates a first display image, based on an image signal output from an image pick-up device including first and second pixel groups on which respective images are formed by a pupil-divided subject-image that has passed through first and second regions of an imaging lens;
a second display image generation section that generates a second display image for use in focus-checking based on first and second image signals output from the first and second pixel groups;
an acquisition section that acquires color data of the first display image generated by the first display image generation section;
a determination section that, based on the color data acquired by the acquisition section, determines, as a display color for the second display image a color with different color characteristics from color characteristics of the first display image;
a display section that displays images; and
a display controller that displays on the display section the first display image generated by the first display image generation section, and displays on the display section the second display image generated by the second display image generation section within a display region of the first display image,
wherein the color data is color data representing color characteristics of an object color of the first display image,
wherein the color characteristics of the object color of the first display image is a configuration ratio of primary color components in the first display image, and
wherein the configuration ratio is converted by an input-output function including a declining function, and the configuration ratio obtained after conversion is employed as the different color characteristics.

2. An image capture device comprising:
the image processing device of claim 1; and
a storage section that stores images output from the image pick-up device.

3. A non-transitory computer-readable storage medium storing a program for causing a computer to function as:
the first display image generation section, the second display image generation section, the acquisition section, the determination section, and the display controller of the image processing device of claim 1.

4. An image processing device, comprising:
a first display image generation section that generates a first display image, based on an image signal output from an image pick-up device including first and second pixel groups on which respective images are formed by a pupil-divided subject-image that has passed through first and second regions of an imaging lens;

a second display image generation section that generates a second display image for use in focus-checking based on first and second image signals output from the first and second pixel groups;
an acquisition section that acquires color data of the first display image generated by the first display image generation section;
a determination section that, based on the color data acquired by the acquisition section, determines, as a display color for the second display image a color with different color characteristics from color characteristics of the first display image;
a display section that displays images; and
a display controller that displays on the display section the first display image generated by the first display image generation section, and displays on the display section the second display image generated by the second display image generation section within a display region of the first display image,
wherein the color data is color data representing color characteristics of an object color of the first display image,
wherein the color characteristics of the object color of the first display image is a configuration ratio of primary color components in the first display image,
wherein the configuration ratio is converted by color conversion data, and the configuration ratio obtained after conversion is employed as the different color characteristics, and
wherein the color conversion data is color conversion data generated based on an input-output function including a declining function.

5. An image capture device comprising:
the image processing device of claim 4; and
a storage section that stores images output from the image pick-up device.

6. An image processing device, comprising:
a first display image generation section that generates a first display image, based on an image signal output from an image pick-up device including first and second pixel groups on which respective images are formed by a pupil-divided subject-image that has passed through first and second regions of an imaging lens;
a second display image generation section that generates a second display image for use in focus-checking based on first and second image signals output from the first and second pixel groups;
an acquisition section that acquires color data of the first display image generated by the first display image generation section;
a determination section that, based on the color data acquired by the acquisition section, determines, as a display color for the second display image a color with different color characteristics from color characteristics of the first display image;
a display section that displays images; and
a display controller that displays on the display section the first display image generated by the first display image generation section, and displays on the display section the second display image generated by the second display image generation section within a display region of the first display image,
wherein the first and second pixel groups are each single color pixel groups,
wherein the second display image generation section generates an achromatic image as the second display image based on the first and second image signals output from the first and second pixel groups, and
wherein, in cases in which the second display image is an achromatic image, the determination section determines as the display color of the second display image, a chromatic color with different color characteristics from the color characteristics of the first display image based on the color data acquired by the acquisition section.

7. An image capture device comprising:
the image processing device of claim 6; and
a storage section that stores images output from the image pick-up device.

8. An image processing device comprising:
a first display image generation section that generates a first display image, based on an image signal output from an image pick-up device including first and second pixel groups on which respective images are formed by a pupil-divided subject-image that has passed through first and second regions of an imaging lens;
a second display image generation section that generates a second display image for use in focus-checking based on first and second image signals output from the first and second pixel groups;
an acquisition section that acquires color data of the first display image generated by the first display image generation section;
a determination section that, based on the color data acquired by the acquisition section, determines, as a display color for the second display image a color with different color characteristics from color characteristics of the first display image;
a display section that displays images; and
a display controller that displays on the display section the first display image generated by the first display image generation section, and displays on the display section the second display image generated by the second display image generation section within a display region of the first display image,
wherein, in cases in which the first display image and the second display image are achromatic images, the determination section determines, as the display color of the second display image a chromatic color with different color characteristics from the color characteristics of the first display image based on the color data acquired by the acquisition section.

9. An image capture device comprising:
the image processing device of claim 8; and
a storage section that stores images output from the image pick-up device.

10. An image processing device comprising:
a first display image generation section that generates a first display image, based on an image signal output from an image pick-up device including first and second pixel groups on which respective images are formed by a pupil-divided subject-image that has passed through first and second regions of an imaging lens;
a second display image generation section that generates a second display image for use in focus-checking based on first and second image signals output from the first and second pixel groups;
an acquisition section that acquires color data of the first display image generated by the first display image generation section;

a determination section that, based on the color data acquired by the acquisition section, determines, as a display color for the second display image a color with different color characteristics from color characteristics of the first display image;

a display section that displays images; and a display controller that displays on the display section the first display image generated by the first display image generation section, and displays on the display section the second display image generated by the second display image generation section within a display region of the first display image, wherein, based on the color data acquired by the acquisition section, the determination section determines, as the display color of the second display image, a chromatic color with color characteristics different from the color characteristics of the first display image and also different from a chromatic color for a region based on the first image signal in the second display image and for a region based on the second image signal in the second display image.

11. An image capture device comprising:

the image processing device of claim 10; and a storage section that stores images output from the image pick-up device.

12. An image processing device comprising:

a first display image generation section that generates a first display image, based on an image signal output from an image pick-up device including first and second pixel groups on which respective images are formed by a pupil-divided subject-image that has passed through first and second regions of an imaging lens;

a second display image generation section that generates a second display image for use in focus-checking based on first and second image signals output from the first and second pixel groups;

an acquisition section that acquires color data of the first display image generated by the first display image generation section;

a determination section that, based on the color data acquired by the acquisition section, determines, as a display color for the second display image a color with different color characteristics from color characteristics of the first display image;

a display section that displays images; and a display controller that displays on the display section the first display image generated by the first display image generation section, and displays on the display section the second display image generated by the second display image generation section within a display region of the first display image, wherein, in cases in which a predetermined condition has been satisfied to make the color characteristics of the first display image and the color characteristics of the second display image close to each other, the determination section further determines, as the display color of the second display image a color with color characteristics a predetermined degree near to the color characteristics of the first display image based on the color data acquired by the acquisition section.

13. An image capture device comprising:

the image processing device of claim 12; and a storage section that stores images output from the image pick-up device.

14. An image processing method comprising:

a first display image generation process that generates a first display image, based on an image signal output from an image pick-up device including first and second pixel groups on which respective images are formed by a pupil-divided subject-image that has passed through first and second regions of an imaging lens;

a second display image generation process that generates a second display image for use in focus-checking based on first and second image signals output from the first and second pixel groups;

an acquisition process that acquires color data of the first display image generated by the first display image generation process;

a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image, wherein the color data is color data representing color characteristics of an object color of the first display image, wherein the color characteristics of the object color of the first display image is a configuration ratio of primary color components in the first display image, and wherein the configuration ratio is converted by an input-output function including a declining function, and the configuration ratio obtained after conversion is employed as the different color characteristics.

15. An image processing method comprising:

a first display image generation process that generates a first display image, based on an image signal output from an image pick-up device including first and second pixel groups on which respective images are formed by a pupil-divided subject-image that has passed through first and second regions of an imaging lens;

a second display image generation process that generates a second display image for use in focus-checking based on first and second image signals output from the first and second pixel groups;

an acquisition process that acquires color data of the first display image generated by the first display image generation process;

a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image, wherein the color data is color data representing color characteristics of an object color of the first display image, wherein the color characteristics of the object color of the first display image is a configuration ratio of primary color components in the first display image, wherein the configuration ratio is converted by color conversion data, and the configuration ratio obtained after conversion is employed as the different color characteristics, and wherein the color conversion data is color conversion data generated based on an input-output function including a declining function.

16. An image processing method comprising:

a first display image generation process that generates a first display image, based on an image signal output from an image pick-up device including first and second pixel groups on which respective images are formed by a pupil-divided subject-image that has passed through first and second regions of an imaging lens;

a second display image generation process that generates a second display image for use in focus-checking based on first and second image signals output from the first and second pixel groups;

an acquisition process that acquires color data of the first display image generated by the first display image generation process;

a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image, wherein the first and second pixel groups are each single color pixel groups, wherein the second display image generation process generates an achromatic image as the second display image based on the first and second image signals output from the first and second pixel groups, and wherein, in cases in which the second display image is an achromatic image, the determination process determines as the display color of the second display image, a chromatic color with different color characteristics from the color characteristics of the first display image based on the color data acquired by the acquisition process.

17. An image processing method comprising:

a first display image generation process that generates a first display image, based on an image signal output from an image pick-up device including first and second pixel groups on which respective images are formed by a pupil-divided subject-image that has passed through first and second regions of an imaging lens;

a second display image generation process that generates a second display image for use in focus-checking based on first and second image signals output from the first and second pixel groups;

an acquisition process that acquires color data of the first display image generated by the first display image generation process;

a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image, wherein, in cases in which the first display image and the second display image are achromatic images, the determination process determines, as the display color of the second display image, a chromatic color with different color characteristics from the color characteristics of the first display image based on the color data acquired by the acquisition process.

18. An image processing method comprising:

a first display image generation process that generates a first display image, based on an image signal output from an image pick-up device including first and second pixel groups on which respective images are formed by a pupil-divided subject-image that has passed through first and second regions of an imaging lens;

a second display image generation process that generates a second display image for use in focus-checking based on first and second image signals output from the first and second pixel groups;

an acquisition process that acquires color data of the first display image generated by the first display image generation process;

a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image, wherein, based on the color data acquired by the acquisition process, the determination process determines, as the display color of the second display image, a chromatic color with color characteristics different from the color characteristics of the first display image and also different from a chromatic color for a region based on the first image signal in the second display image and for a region based on the second image signal in the second display image.

19. An image processing method comprising:

a first display image generation process that generates a first display image, based on an image signal output from an image pick-up device including first and second pixel groups on which respective images are formed by a pupil-divided subject-image that has passed through first and second regions of an imaging lens;

a second display image generation process that generates a second display image for use in focus-checking based on first and second image signals output from the first and second pixel groups;

an acquisition process that acquires color data of the first display image generated by the first display image generation process;

a determination process that, based on the color data acquired by the acquisition process, determines, as a display color for the second display image, a color with different color characteristics from color characteristics of the first display image; and a display control process that displays on a display section for displaying images the first display image generated by the first display image generation process, and displays on the display section the second display image generated by the second display image generation process within a display region of the first display image, wherein, in cases in which a predetermined condition has been satisfied to make the color characteristics of the first display image and the color characteristics of the second display image close to each other, the determination process further determines, as the display color of the second display image, a color with color characteristics a predetermined degree near to the color characteristics of the first display image based on the color data acquired by the acquisition process.

* * * * *